(12) United States Patent
Dimmick et al.

(10) Patent No.: US 6,623,188 B1
(45) Date of Patent: Sep. 23, 2003

(54) DISPERSION TOLERANT OPTICAL DATA TRANSMITTER

(75) Inventors: Timothy Eugene Dimmick, Oviedo, FL (US); Heider Nalm Ereifej, Orlando, FL (US); Kenneth James Ritter, Orlando, FL (US)

(73) Assignee: Optiuh Corporation, Chalfont, PA (US)

( * ) Notice: Subject to any disclaimer, the term of this patent is extended or adjusted under 35 U.S.C. 154(b) by 31 days.

(21) Appl. No.: 10/071,288

(22) Filed: Feb. 8, 2002

(51) Int. Cl.$^7$ .............................................. H04B 10/04
(52) U.S. Cl. ........................ 398/182; 398/183; 398/190
(58) Field of Search ................................. 359/161, 180, 359/181, 184, 185, 186; 385/2, 3; 375/291, 296, 297

(56) References Cited

U.S. PATENT DOCUMENTS

| | | | |
|---|---|---|---|
| 5,109,441 A | 4/1992 | Glaab | ........................... 385/1 |
| 5,543,952 A | 8/1996 | Yonenaga et al. | |
| 5,867,534 A | 2/1999 | Price et al. | |
| 5,892,858 A | 4/1999 | Vaziri et al. | |
| 5,917,638 A | 6/1999 | Franck et al. | |
| 5,917,642 A | 6/1999 | O'Donnell et al. | ......... 359/245 |
| 5,920,416 A | 7/1999 | Beylat et al. | |
| 5,999,297 A | 12/1999 | Penninckx | |
| 6,097,525 A | 8/2000 | Ono et al. | |
| 6,124,960 A | 9/2000 | Garthe et al. | ................ 359/181 |
| 6,188,497 B1 * | 2/2001 | Franck et al. | ................ 359/181 |
| 6,424,444 B1 * | 7/2002 | Kahn et al. | .................. 359/173 |

FOREIGN PATENT DOCUMENTS

| | | |
|---|---|---|
| EP | 1005201 | 5/2000 |
| EP | 1026863 | 8/2000 |

OTHER PUBLICATIONS

Lender, A., "Correlative Level Coding For Binary–Data Transmission", IEEE Spectrum, pp. 104–115, Feb. 1966.

Pasupathy, S., "Correlative Coding: A Bandwidth–Efficient Signaling Scheme", IEEE Communications Society Magazine, pp. 4–11, Jul. 1977.

Lender, A., "The Duobinary Technique for High–Speed Data Transmission", IEEE Trans. Commun. Electron., vol. CE–82, pp. 214–218, May 1963.

Gu, X, et al., "GB/s Unrepeatered Three–Level Optical Transmission Over 100 km of Standard Fibre", Electronics Letters, vol. 29, No. 29, pp. 2209–2210, received Oct. 8, 1993.

May, G., et al., "Extended 10GB/s Fiber Transmission Distance At 1538 nm Using A Duobinary Receiver", IEEE Photonics Technol. Lett., vol. 6, No. 5, pp. 648–650 (received May 12, 1993).

Price, A.J., et al., "Reduced Bandwidth Optical Intensity Modulation With Improved Chromatic Dispersion Tolerance", Electronics Letters, vol. 31, No. 1, pp. 58–59 (received Oct. 25, 1994).

\* cited by examiner

Primary Examiner—Leslie Pascal
Assistant Examiner—Dalzid Singh
(74) Attorney, Agent, or Firm—Rauschenbach Patent Law Group, LLC; Kurt Rauschenbach

(57) ABSTRACT

An optical data transmitter is described that includes a precoder that converts an input data signal to a binary precoded data signal and to a complementary binary precoded data signal. A delay element delays one of the complementary binary precoded data signal and the binary precoded data signal relative to the other by a time corresponding to less than one bit period of the binary precoded data signal. A differential amplifier converts the binary precoded data signal and the complementary binary precoded data signal to a four-level data signal and to a complementary four-level data signal. An optical data modulator modulates an amplitude of an optical signal applied to an optical input of the optical data modulator in response to at least one of the four-level data signal and the complementary four-level data signal to generate a modulated optical output signal.

34 Claims, 14 Drawing Sheets

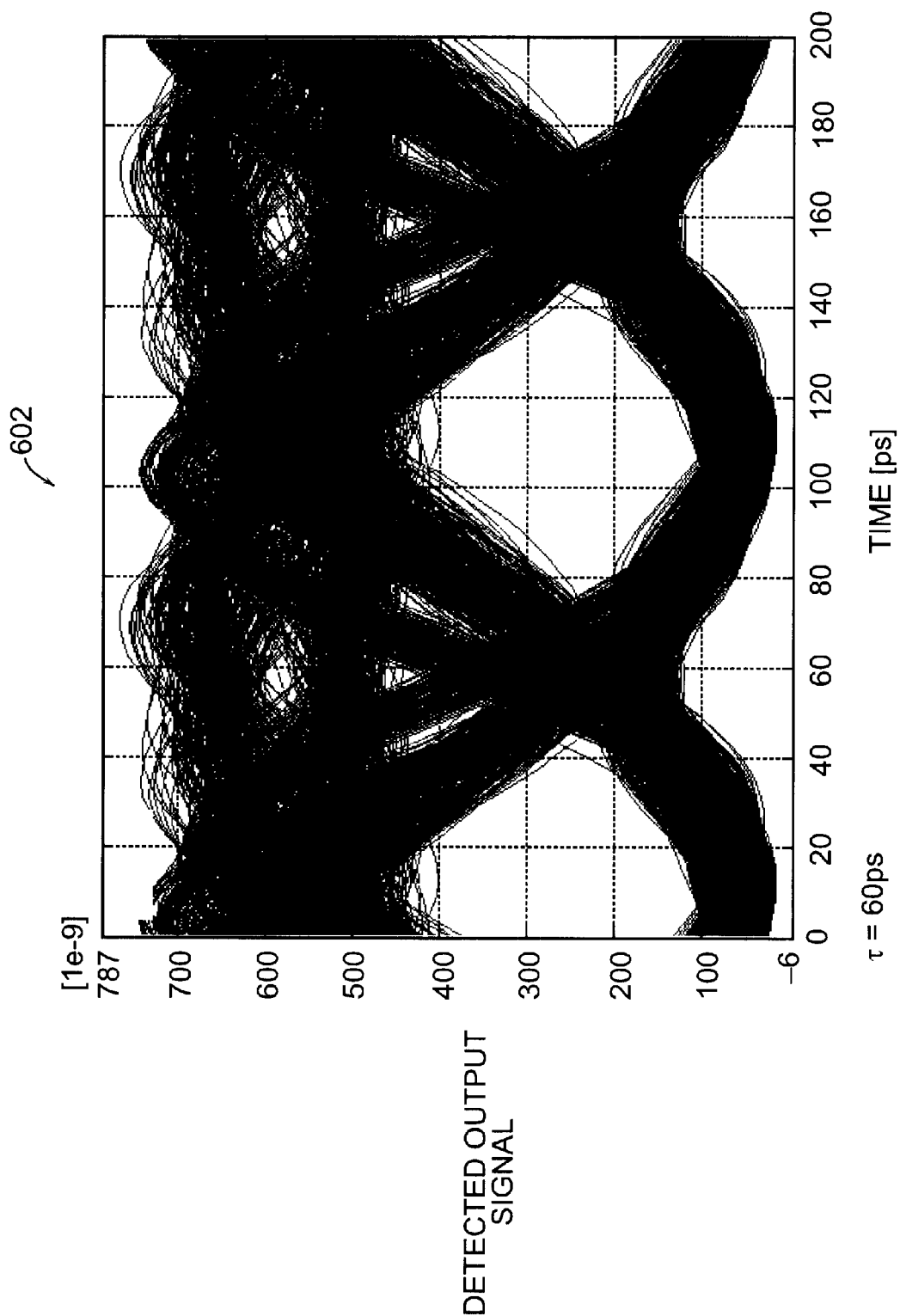

DISPERSION TOLERANT OPTICAL DATA TRANSMITTER

CROSS REFERENCE TO RELATED APPLICATIONS

This application is related to pending U.S. patent application, Attorney Docket No. OPT-005, filed on Feb. 8, 2002, the entire disclosure of which is incorporated herein by reference.

FIELD OF THE INVENTION

This invention relates to optical data transmitters. In particular the invention relates to optical data transmitters that have relatively high tolerance to effects of fiber dispersion and nonlinearity compared with conventional NRZ fiber-optic transmitters.

BACKGROUND OF THE INVENTION

In the information age, the demand for data networks of higher and higher data capacities, at lower and lower costs is constantly increasing. This demand is fueled by many different factors, such as the tremendous growth of the Internet and the World Wide Web. The increasing numbers of on-line users of the Internet and the World Wide Web have greatly increased the demand for bandwidth because of the proliferation of bandwidth-intensive applications such as audio and video streaming and file transfer.

Optical fiber transmission has played a key role in increasing the bandwidth of telecommunications networks. Optical fiber offers much higher bandwidths than copper cables and is much less susceptible to various types of electromagnetic interference and other undesirable effects. As a result, it is the preferred medium for transmission of data at high data rates and over long distances.

At very high data rates, chromatic dispersion in optical fiber transmission lines causes waveform deterioration and becomes a limiting factor in standard single-mode optical fiber. Although dispersion-shifted optical fiber exists, which exhibits very low dispersion at optical fiber transmission wavelengths, there is a large installed base of standard signal-mode optical fiber. Thus, there is a great demand for dispersion tolerant data transmission systems.

Correlative coding techniques can be used to enhance tolerance to fiber dispersion and other non-linear effects. Correlative coding techniques, also known as partial response signaling, were developed in the 1960s. One type of correlative coding technique is called duobinary signaling. Duobinary coding was first published in 1963 by A. Lender in "Duobinary Technique for High Speed Data Transmission," IEEE. Trans. Commun. Electron., vol. CE-82, pp. 214–218, May 1963.

A duobinary (DB) signal is created by delaying a binary bit sequence by one full bit and then adding the delayed binary bit sequence to the original bit sequence. See, for example, U.S. Pat. No. 5,917,638 issued to Franck et al. The DB signal can be expressed as follows:

$$DB_i = m_i + m_{i-1}. \quad (1)$$

The DB signal is a three level sequence with one half of the bandwidth of the binary bit sequence m. Duobinary coding reduces the signal bandwidth by mapping a binary data signal having two levels to be transmitted into a three-level signal having three meaningful values or levels. See, for example, U.S. Pat. No. 5,867,534 issued to Price et al. The signal received by the receiver is interpreted in terms of three levels rather than two levels. The reduction in signal bandwidth reduces the waveform deterioration caused by chromatic dispersion.

Duobinary coding has been implemented with optical signals using a Mach-Zehnder interferometric modulator biased at the quadrature point and a three level intensity detector as the receiver. See for example, X. Gu and L.C. Blank, "10 GB/s unrepeatered three-level optical transmission over 100 km of standard fibre," Electronics Letters Vol. 29 No. 25 pp 2209–2210 (received Oct. 8, 1993).

An optical duobinary transmission system has been proposed that uses a two-level (on, off) approach. See, for example, K. Yonenaga, S. Kuwano, S. Norimatsu and N. Shibata, "Optical duobinary transmission system with no receiver sensitivity degradation," Electronics Letters Vol. 31 No. 4 pp 302–304 (received Dec. 7, 1994). Since typical optical detectors respond to optical intensity as opposed to amplitude, decoding is automatically achieved at the detector and duobinary decoding is not necessary. The system requires that the phase of the "on" state signal take the values of either '0' or '$\pi$'. The two 'on' states correspond to the '+1' and '−1' states of the duobinary signal, and the 'off' state corresponds to the '0' state of the duobinary signal.

The optical duobinary signal is generated by driving a dual-drive Mach-Zehnder modulator with push-pull operation. Two duobinary signals for driving the Mach-Zehnder are generated from original binary signals by using two duobinary encoders. The two duobinary signals are applied to two electrodes of the Mach-Zehnder modulator. The '0' state of the duobinary signal is equal to the zero level. The '+1' and '−1' states have the same magnitude and opposite signs for push-pull operation.

SUMMARY OF THE INVENTION

The dispersion tolerant optical data transmitter of the present invention performs preceding. The precoding can be accomplished either at the line rate or at a lower rate if a multiplexer is used. Decoding is performed at the receiver by a square law detector. In one embodiment, a delay of less than a full bit period is used.

The dispersion tolerant optical data transmitter of the present invention is approximately a factor of four less sensitive to chromatic dispersion than conventional optical transmitters. Also, the dispersion tolerant optical data transmitter of the present invention is less sensitive to fiber nonlinearities and can transmit at higher power levels, and therefore, longer distances, because the carrier is suppressed.

Accordingly, in one aspect, the present invention is embodied in an optical data transmitter including a precoder that converts an input data signal to a binary precoded data signal and to a complementary binary precoded data signal at an output and a complementary output, respectively. In one embodiment, the precoder is a serial precoder.

In another embodiment, the precoder is a parallel precoder having n sets of parallel data inputs that receive n sets of parallel data. The parallel precoder generates n sets of parallel precoded data at n sets of parallel outputs from the n sets of parallel data. The parallel precoder also includes a multiplexer having n sets of parallel data inputs that are coupled to the n sets of parallel outputs of the parallel precoder, respectively. The multiplexer generates the binary precoded data signal and the complementary binary precoded data signal at the output and the complementary output, respectively.

The optical data transmitter also includes a delay element coupled to one of the output and the complementary output of the precoder. The delay element delays one of the complementary binary precoded data signal and the binary precoded data signal relative to the other at an output of the delay element, by a time corresponding to less than one bit period of the binary precoded data signal.

In one embodiment, the delay element delays one of the complementary binary precoded data signal and the binary precoded data signal relative to the other by a time corresponding to between 0.4 and 0.9 of the bit period of the binary precoded data signal. In one embodiment, the delay element includes a variable delay element. In one embodiment, the delay element is selected to increase dispersion tolerance of a communication system that includes the optical data transmitter.

The optical data transmitter further includes a differential amplifier having a first input that is coupled to an output of the delay element and a second input that is coupled to one of the output and the complementary output of the precoder. The differential amplifier converts the binary precoded data signal and the complementary binary precoded data signal to a four-level data signal and to a complementary four-level data signal at a differential output and a complementary differential output, respectively.

In one embodiment, the four-level data signal includes a minimum amplitude, a first intermediate amplitude, a second intermediate amplitude, and a maximum amplitude. An average of the minimum amplitude and the maximum amplitude is substantially equal to an average of the first intermediate amplitude and the second intermediate amplitude.

The optical data transmitter also includes an optical data modulator having a data input that is coupled to one of the differential output and the complementary differential output of the differential amplifier. The optical data modulator modulates an amplitude of the optical signal applied to an optical input of the optical data modulator in response to at least one of the four-level data signal and the complementary four-level data signal, respectively, to generate a modulated optical output signal.

In one embodiment, the optical data modulator includes a single input zero-chirp Mach-Zehnder modulator. In another embodiment, the optical data modulator includes a second data input that is coupled to the other one of the differential output and the complementary differential output. The optical data modulator modulates an amplitude of the optical input signal in response to the four-level data signal and the complementary four-level data signal to generate a modulated optical output signal. In yet another embodiment, the optical data modulator includes a differential input Mach-Zehnder modulator.

In one embodiment, the modulator includes a predetermined operating point that is chosen so an intensity of the modulated output optical signal is minimized when the amplitude of the four-level data signal is substantially equal to an average of the four levels of the four-level data signal. In one embodiment, the modulator includes a predetermined operating point that is chosen so an intensity of the output optical signal is minimized when the amplitude of the four-level data signal is substantially equal to an average of the four levels of the four-level data signal, and the amplitude of the complementary four-level data signal is substantially equal to an average of the four levels of the complementary four-level data signal.

In one embodiment, the optical data transmitter also includes a bias voltage source that adjusts an average amplitude of at least one of the four-level data signal and the complementary four-level data signal to change an operating point of the optical data modulator.

In one embodiment, the optical data transmitter further includes a filter having an input that is coupled to one of the differential output and the complementary differential output of the differential amplifier and having an output that is coupled to the data input of the optical data modulator. The filter reduces the bandwidth of at least one of the four-level and complementary four-level data signal. In one embodiment, the filter provides an adjustable cut-off frequency.

In one embodiment, the optical data transmitter further includes at least one of a first and a second filter. The first filter includes an input that is coupled to the differential output and an output that is coupled to the first data input of the modulator. The second filter includes an input that is coupled to the complementary differential output of the differential amplifier and an output that is coupled to the second data input of the optical data modulator. The first and the second filters reduce the bandwidth of the four-level and the complementary four level data signal, respectively. In one embodiment, at least one of the first and the second filter provides an adjustable cut-off frequency.

In another aspect, the present invention is embodied in a method for coding an optical data signal. The method includes converting an input data signal to a binary precoded data signal and to a complementary binary precoded data signal. In one embodiment, converting the input data signal to a binary precoded data signal and to a complementary binary precoded data signal includes converting n sets of parallel data signals to n sets of parallel precoded data signals, and multiplexing the n sets of parallel precoded data signals to generate the binary precoded data signal and the complementary binary precoded data signal.

The method also includes generating a delayed data signal by delaying one of the complementary binary precoded data signal and the binary precoded data signal relative to the other by less than one bit period of the binary precoded data signal. In one embodiment, the generating the delayed data signal includes delaying one of the complementary binary precoded data signal and the binary precoded data signal relative to the other by a time corresponding to between 0.4 and 0.9 of the bit period of the binary precoded data signal.

In another embodiment, the generating the delayed data signal includes delaying by a time that increases dispersion tolerance of a communication system using the method for coding an optical data signal.

The method further includes converting the delayed data signal and the other of the complementary binary precoded data signal and the binary precoded data signal to a four-level data signal and to a complementary four-level data signal. In another embodiment, the four-level data signal includes a minimum amplitude, a first intermediate amplitude, a second intermediate amplitude, and a maximum amplitude. An average of the minimum amplitude and the maximum amplitude is substantially equal to an average of the first intermediate amplitude and the second intermediate amplitude.

The method further includes modulating an optical signal with at least one of the four level data signal and the complementary four-level data signal, thereby generating a modulated optical output signal with four amplitude levels.

In one embodiment, the method further includes adjusting at least one of the first intermediate and the second intermediate amplitude relative to the minimum amplitude and to the maximum amplitude to increase dispersion tolerance of a communication system using the method for coding an optical data signal. In another embodiment, adjusting at least one of the first intermediate and the second intermediate amplitude relative to the minimum amplitude and to the maximum amplitude includes filtering at least one of the four-level data signal and the complementary four-level data signal.

In one embodiment, the adjusting at least one of the first intermediate amplitude and the second intermediate amplitude relative to the minimum amplitude and to the maximum amplitude includes delaying one of the complementary binary precoded data signal and the binary precoded data signal relative to the other by less than one bit period of the binary precoded data signal.

In one embodiment, an amplitude of the modulated optical output signal is substantially zero when the at least one of the four-level data signal and the complementary four-level data signal is substantially equal to an average of amplitudes of the four levels comprising the at least one of the four-level data signal and the complementary four-level data signal.

BRIEF DESCRIPTION OF THE DRAWINGS

This invention is described with particularity in the below description. The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

FIG. 9B illustrates a simulated 10 Gb/s optical eye diagram for a received signal transmitted over 150 km of optical fiber with dispersion of 16 ps/(km·nm) by the transmitter of FIG. 8 with the delay element generating a delay equal to 0.6T (60 ps).

DETAILED DESCRIPTION

Figure 1:
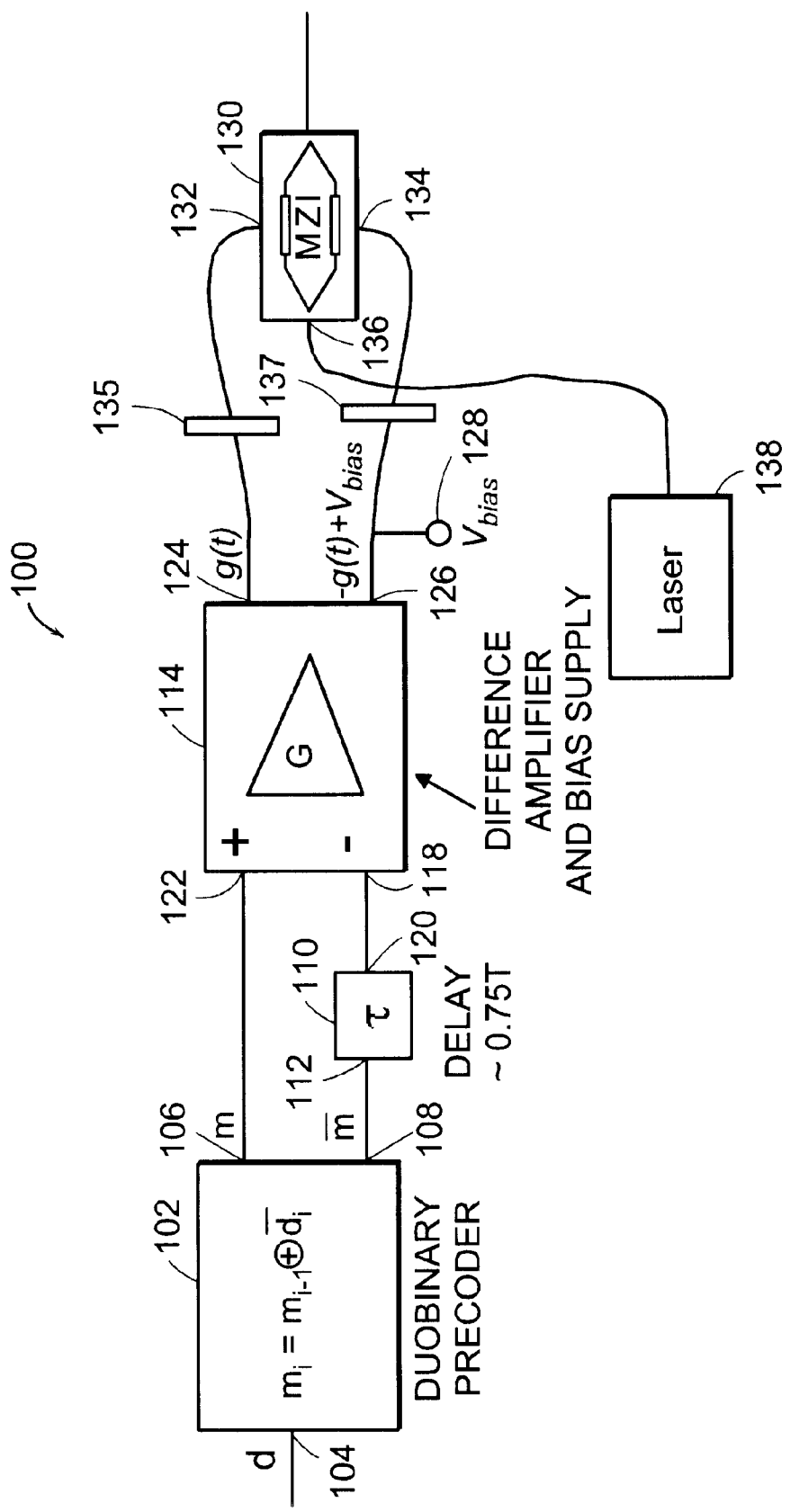
FIG. 1 illustrates one embodiment of a dispersion tolerant transmitter according to the present invention that includes a serial data input.

FIG. 1 illustrates one embodiment of a dispersion tolerant transmitter 100 according to the present invention that includes a serial data input 104. The transmitter 100 includes a serial duobinary precoder 102. The serial duobinary precoder 102 has a serial data input 104 that receives an input data signal. The duobinary precoder 102 also has an output 106 and a complementary output 108 that generates a binary precoded data signal and a complementary binary precoded data signal, respectively.

The transmitter 100 also includes a delay element 110 having an input 112 that is coupled to the complementary output 108 of the duobinary precoder 102. In one embodiment, the delay element 110 delays the complementary binary precoded data signal relative to the binary precoded data signal by a time corresponding to less than one bit period of the binary precoded data signal.

The transmitter 100 also includes a differential amplifier 114 having a first input 118 that is coupled to an output 120 of the delay element 110 and a second input 122 that is coupled to the output 106 of the precoder 102. In another embodiment (not shown), the delay element 110 is coupled between the output 106 of the duobinary precoder 102 and the second input 122 of the differential amplifier 114. In this embodiment, the complementary output 108 of the duobinary precoder 102 is directly coupled to the first input 118 of the differential amplifier 114.

In yet another embodiment (not shown), the delay element 110 is coupled between the output 108 of the duobinary precoder 102 and the first input 18 of the differential amplifier 114. A second delay element (not shown) is coupled between the output 106 of the duobinary precoder 102 and the second input 122 of the differential amplifier 114.

In one embodiment, the delay element 110 is integrated into a cable (not shown) that couples the complementary output 108 of the duobinary precoder 102 to the first input 118 of the differential amplifier 114. In another embodiment, the delay element 110 comprises the cable itself and the delay is generated by propagating the complementary binary precoded data signal through the cable. In this embodiment, the length of the cable is selected to correspond to the delay.

The differential amplifier 114 converts the binary precoded data signal and the complementary binary precoded data signal to a difference signal g(t) and to a complementary difference signal −g(t) at a differential output 124 and a complementary differential output 126, respectively. The difference signal g(t) and the complementary difference signal −g(t) are four-level data signals. By four-level data signals we mean both the difference signal g(t) and the complementary difference signal −g(t) include four (4) meaningful values or levels.

In one embodiment, a bias network, such as a bias tee 128, adds a bias voltage to one of the difference signal g(t) and the complementary difference signal −g(t). In the embodiment shown, the bias tee 128 adds a bias voltage to the complementary difference signal −g(t) to generate a complementary difference signal with a DC offset voltage −g(t)+$V_{bias}$. In another embodiment, the differential amplifier 114 generates a complementary difference signal −g(t) that includes a bias voltage.

In addition, the transmitter 100 includes an optical data modulator 130. Numerous types of optical data modulators can be used with the transmitter 100 of the present invention. In the embodiment shown, the optical data modulator 130 is a differential input Mach Zehnder interferometric (MZI) data modulator having a first 132 and a second data input 134 that are coupled to the differential output 124 and the complementary differential output 126, respectively, of the differential amplifier 114.

Differential input MZI data modulators are advantageous because they require lower drive voltages compared with single input MZI data modulators. The required drive voltage for each input of the differential input data modulator 130 is one half of the required voltage for a single input data modulator (not shown).

In the embodiment shown, the differential amplifier 114 directly drives the differential input data modulator 130 in a push-pull manner. Thus, in this embodiment, the differential amplifier 114 is both a driver for the differential input data modulator 130 and an amplifier that converts the binary precoded data signal and the complementary binary precoded data signal to a four-level data signal and to a complementary four-level data signal.

In one embodiment, the optical data transmitter 100 further includes a filter 135 that is coupled to either the differential output 124 or the complementary differential output 126 of the differential amplifier 114 and coupled to one of the first 132 and the second data input 134 of the optical data modulator 130. The filter 135 reduces the bandwidth of at least one of the four-level and complementary four-level data signal. In one embodiment, the filter 135 provides an adjustable cut-off frequency.

In another embodiment, the optical data transmitter 100 further includes a first 135 and a second filter 137. The first filter 135 is coupled to the differential output 124 of the differential amplifier 114 and is coupled to the first data input 132 of the optical data modulator 130. The second filter 137 is coupled to the complementary differential output 126 of the differential amplifier 114 and is coupled to the second data input 134 of the optical data modulator 130. The first 135 and the second filters 137 reduce the bandwidth of the four-level and the complementary four level data signal, respectively. In one embodiment, at least one of the first 135 and the second filter 137 provides an adjustable cut-off frequency.

The data modulator 130 also includes an optical input 136 that receives an optical signal from an optical source, such as a laser 138. The data modulator 130 modulates an amplitude of a continuous wave optical signal in response to the difference signal g(t) and the complementary difference signal with a DC offset voltage −g(t)+$V_{bias}$ and generates a modulated optical output signal.

The dispersion tolerant transmitter 100 has a greater tolerance to the effects of fiber dispersion as compared with both conventional NRZ fiber-optic transmitters and prior art duobinary transmitters due, at least in part, to the fact that the optical amplitude of the modulated optical signal oscillates about zero because the delay generated by the delay element 110 is less than one full bit period. The oscillations tend to decay to zero as the signal propagates down the fiber, thereby preserving the amplitude of the ones without degrading the zero level. The oscillations have peaks that occur at the boundaries of the bits, so the oscillations do not degrade the extinction ratio. These oscillations are not present in prior art duobinary signals where the delay is a full bit period.

In another embodiment, the optical data modulator 130 is a single input zero-chirp Mach-Zehnder modulator (not shown). In this embodiment, the zero-chirp MZI modulator includes a single input that is coupled to one of the differential output 124 and the complementary differential output 126 of the differential amplifier 114. The zero-chirp MZI modulator is driven by one of the difference signal g(t) and the complementary difference signal −g(t).

The optical data modulator 130 can have relatively low bandwidth compared with optical data modulators operating at the comparable bit rates because the four-level data signal that drives the modulator 130 has lower bandwidth. Thus, relatively inexpensive optical data modulators can be used with the transmitter 100 of the present invention, thereby reducing the total cost of the optical data transmitter 100.

In one embodiment, the optical data modulator 130 is designed with a preset bias point such that a separate bias voltage is not required. In another embodiment, the optical data modulator 130 includes a separate input (not shown) for applying a bias voltage to the modulator 130. In this embodiment, a separate bias voltage source (not shown) is applied to the input in order to set the modulator operating point.

In operation, the optical transmitter 100 receives a serial stream of binary data bits (d) at a bit rate equal to 1/T, where T is the bit period, at the serial data input 104 of the duobinary precoder 102. The binary data bits (d) are coded by the duobinary precoder 102. The duobinary precoder 102 generates a binary precoded bit sequence m and a complementary binary precoded bit sequence $\overline{m}$ at the output 106 and the complementary output 108 of the duobinary precoder 102, respectively. In one embodiment, the binary precoded bit sequence m is generated according to:

$$m_i = m_{i-1} \oplus d_i, \tag{2}$$

where i is the bit index and $\oplus$ is the logical exclusive OR (XOR) operator. Time varying electrical signals m(t) and $\overline{m}$(t) correspond to the binary precoded bit sequence m and the complementary binary precoded bit sequence $\overline{m}$, respectively.

The delay element 110 delays the complementary precoded data signal $\overline{m}$(t) relative to the precoded data signal m(t) in time. In one embodiment, the delay element 110 delays the complementary precoded data signal $\overline{m}$(t) relative to the precoded data signal m(t) by an amount of time that is substantially in the range of 0.4T to 0.9T. The optimum time delay depends on the bandwidth of the signals and the linearity of the differential amplifier 114. For example, the optimum time delay for a bandwidth of seventy-five percent (75%) of the bit rate and a linear differential amplifier is approximately 0.75T.

The differential amplifier 114 receives the precoded data signal m(t) and the delayed complementary binary precoded data signal $\overline{m}$(t) and converts the binary precoded data signal m(t) and the complementary binary precoded data signal $\overline{m}$ (t) to a four-level data signal g(t) and to a complementary four-level data signal –g(t) at the differential output 124 and the complementary differential output 126, respectively. The four-level data signal g(t) can be expressed as:

$$g(t)=k(m(t)-\overline{m}(t-\tau)) \qquad (3)$$

where, k is the amplifier gain. In one embodiment, the differential amplifier 114 is not AC coupled. In this embodiment, the differential amplifier 114 includes a DC bias level $V_{offset}$ such that the four-level data signal is given by $g(t)+V_{offset}$ and the complementary four-level data signal is given by $-g(t)+V_{offset}$.

In the embodiment shown, the bias tee 128 adds a bias voltage $V_{bias}$ to the complementary four-level data signal –g(t) to generate a complementary four-level data signal with a DC offset bias voltage $-g(t)+V_{bias}$. Thus, the differential amplifier 114 and bias tee 128 generates two signals, the four-level data signal g(t) and the complementary four-level data signal with the DC offset bias voltage $-g(t)+V_{bias}$.

The four level data signal g(t) and the complementary four-level data signal with the DC offset bias voltage $-g(t)+V_{bias}$ differ from duobinary coded signals in that the signals have two intermediate levels in addition to maximum and minimum levels for a total of four levels. The intermediate levels are manifested as ripples with peaks occurring at the boundaries of the bit slots.

The differential input (MZI) data modulator 130 receives the optical signal generated by the laser 138. The data modulator 130 also receives the four level data signal g(t) and the complementary four-level data signal with the DC offset bias voltage $-g(t)+V_{bias}$ from the differential amplifier 114 and the bias tee 128. The data modulator 130 generates a modulated optical data signal.

In one embodiment, the gain of the differential amplifier 114 is chosen such that the peak-to-peak amplitude of g(t) is V π for the differential input MZI data modulator 130. In another embodiment where the data modulator is a single input zero chirp modulator (not shown), the gain of the differential amplifier 114 is chosen such that the peak-to-peak amplitude of g(t) is 2V π. These embodiments correspond to maximum optical transmission through the modulator.

The signals transmitted by the transmitter 100 can be directly decoded or recovered by binary intensity direct detection. Binary intensity direct detection is accomplished by squaring the received optical amplitude signal. Since squaring the optical amplitude is the natural function of a square law optical detector, no special processing at the receiver is required to recover the original binary data sequence d.

Figure 2A:
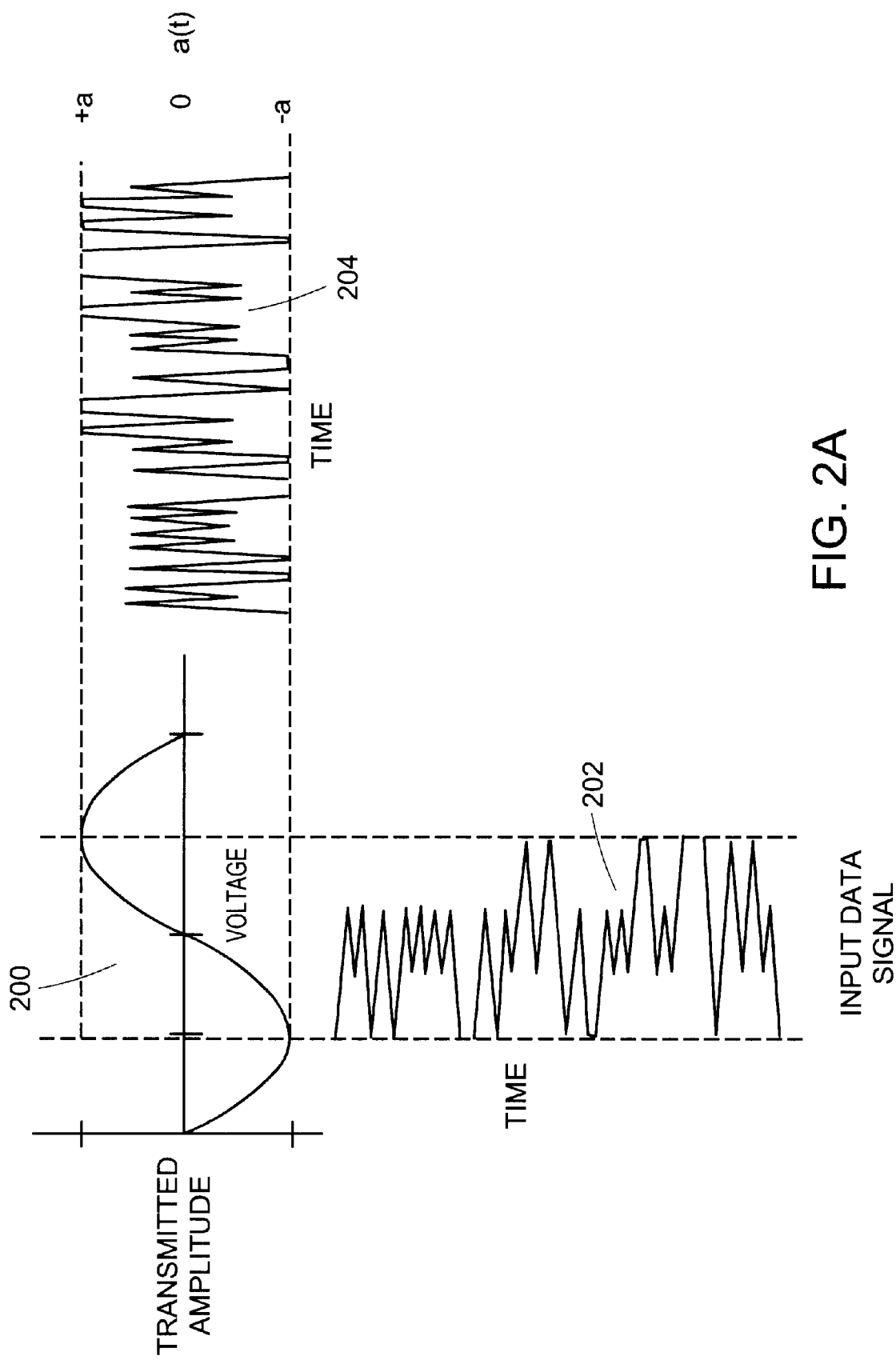
FIG. 2A illustrates transmitted optical amplitude transfer characteristics of a MZI data modulator that can be used in the dispersion tolerant transmitter of the present invention.

FIG. 2A illustrates transmitted optical amplitude transfer characteristics 200 of a MZI data modulator that can be used with the dispersion tolerant transmitter of the present invention. The MZI data modulator can be either a single input zero chirp MZI data modulator or a differential input MZI data modulator.

The MZI data modulator is driven by a four level input data signal 202 according to the present invention. The four level input data signal 202 is either directly applied to the input of a single input zero chirp MZI modulator or is a difference signal that is generated by applying signals to the two inputs of the differential input MZI data modulator. The MZI data modulator generates a modulated optical amplitude data signal a(t) 204 that is bipolar and that includes four amplitude levels. The modulator bias voltage is chosen so that when the four level input data signal 202 is equal to the average of the four levels comprising the four level input data signal 202, the optical output of the MZI data modulator is zero.

Figure 2B:
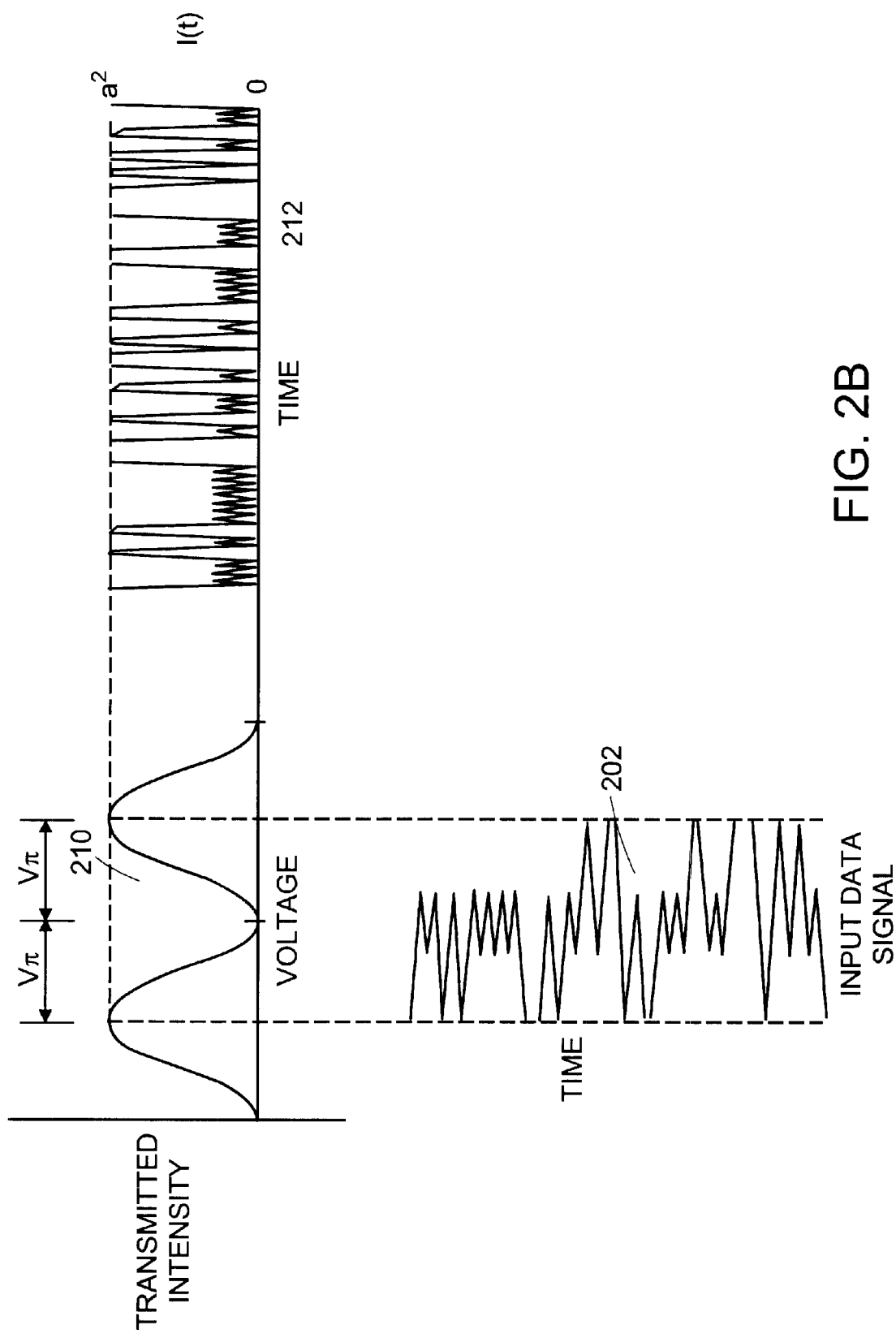
FIG. 2B illustrates transmitted optical intensity transfer characteristics of a MZI data modulator that can be used in the dispersion tolerant transmitter of the present invention.

FIG. 2B illustrates transmitted optical intensity transfer characteristics of a MZI data modulator that can be used in the dispersion tolerant transmitter of the present invention. The four level input data signal 202 is either directly applied to the input of a single input zero chirp MZI modulator or is a difference signal that is generated by applying signals to the two inputs of a differential input MZI data modulator. The MZI data modulator generates an optical intensity data signal I(t) 212 that has a minimum at zero intensity and is proportional to the square of the optical amplitude data signal a(t) 204 (FIG. 2A).

Figure 3:
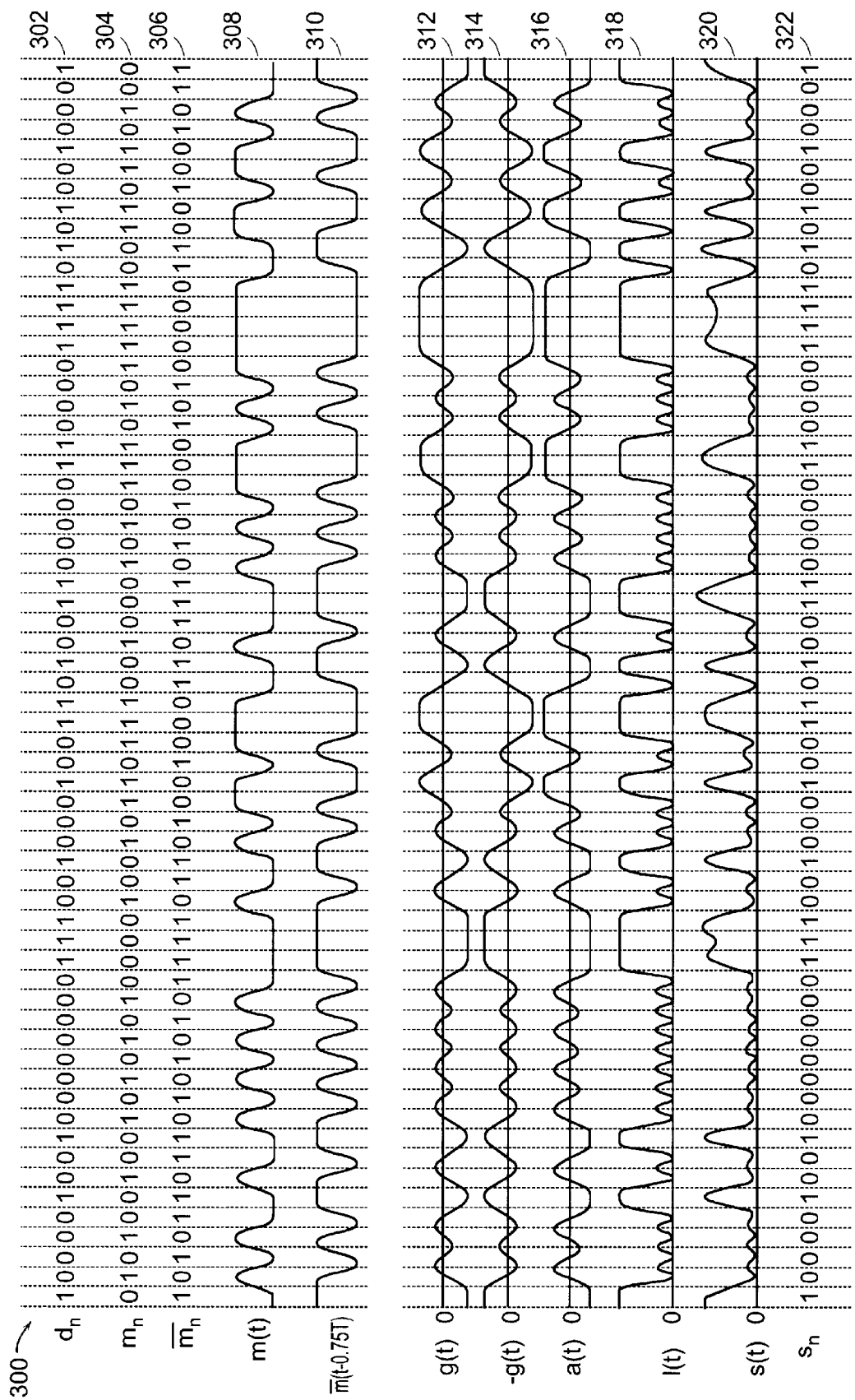
FIG. 3 illustrates a representative bit sequences and signals showing operation of the dispersion tolerant transmitter of FIG. 1.

FIG. 3 illustrates a representative bit sequences and signals 300 showing operation of the dispersion tolerant transmitter 100 of FIG. 1. The bit sequences and signals 300 are represented for a delay element 110 (FIG. 1) that generates a delay of 0.75T, which corresponds to the optimum time delay for a bandwidth of approximately seventy-five percent (75%) of the bit rate.

A representative binary data bit graph 302 shows a representative stream of binary data bits $d_n$ at a bit rate equal to 1/T, where T is the bit period. A binary precoded data graph 304 illustrates a binary precoded bit sequence m that corresponds to the binary data bit sequence d in the binary data bit graph 302 after being processed by the duobinary precoder 102 (FIG. 1). A complementary binary precoded data graph 306 illustrates the complementary binary precoded bit sequence $\overline{m}$ that corresponds to the binary data bits dn in the binary data bit graph 302 after being processed by the duobinary precoder 102.

A time varying electrical signal graph 308 illustrates a time varying electrical signal m(t) that corresponds to the binary precoded bit sequence m. A delayed complementary time varying electrical signal graph 310 represents the complementary time varying electrical signal after being delayed by the delay element 110 (FIG. 1).

A four-level data signal graph 312 illustrates the four-level data signal g(t) generated by the differential amplifier 114 (FIG. 1) at the differential output 124. The complementary four-level data signal graph 314 illustrates the complementary four-level data signal –g(t) generated by the differential amplifier 114 at the complementary differential output 126. The data signal g(t) and the complementary data signal –g(t) are four-level data signals because the delay generated by the delay element 10 is less than one full bit period. If the delay generated by the delay element 110 (FIG. 1) is one full bit period (not shown), the data signal g(t) and the complementary data signal –g(t) would be a three level duobinary signal.

A modulated optical amplitude graph 316 illustrates the optical amplitude a(t) of the modulated optical signal that is modulated in response to the four-level data signal g(t) and the complementary four-level data signal –g(t). The optical amplitude of the modulated optical signal is bipolar and includes four levels.

In one embodiment, the optical data modulator 130 (FIG. 1) includes a predetermined operating point that is chosen so that an intensity of the modulated optical signal is minimized when the amplitude of the four-level data signal is substantially equal to an average of the four levels of the four-level data signal. In one embodiment, the optical data modulator 130 includes a predetermined operating point that is chosen so that an intensity of the modulated optical signal is minimized when the amplitude of the four-level data signal is substantially equal to an average of the four levels of the four-level data signal, and the amplitude of the complementary four-level data signal is substantially equal to an average of the four levels of the complementary four-level data signal.

The intermediate two levels of the optical amplitude signal have peaks that occur at the boundaries of the bit slots. These peaks alternate in sign so that they average to zero amplitude as they broaden under the influence of dispersion. The alternating peaks have the beneficial effect of preserving the amplitude of the neighboring ones (maximum and minimum levels) as well as the zero level. This significantly improves the dispersion tolerance relative to the dispersion tolerance of prior art 3-level duobinary transmission.

An optical intensity graph 318 illustrates the optical power I(t) of the optical signal that is modulated in response to the four-level data signal and the complementary four-level data signal. The optical power I(t) is proportional to the square of the optical amplitude a(t). The optical power I(t) is a three level signal.

The signals transmitted by the transmitter 100 can be directly decoded or can be recovered by binary intensity direct detection. Binary intensity direct detection is accomplished by squaring the received optical amplitude signal. Since squaring the optical amplitude is a natural function of a square law optical detector, no special processing at the receiver is required to recover the original binary data sequence d.

In addition, the representative bit sequences and signals shown in FIG. 3 includes a received signal graph 320 that illustrates a received signal s(t) that represents the simulated electrical output of a noiseless detector following propagation through 150 km of optical fiber with a dispersion coefficient of 16 ps/(km·nm). The received signal s(t) represents a significant improvement in dispersion tolerance compared with signals that are coded with duobinary signaling. A received bit sequence graph 322 shows the received bit sequence corresponding to the received signal s(t).

Figure 4A:
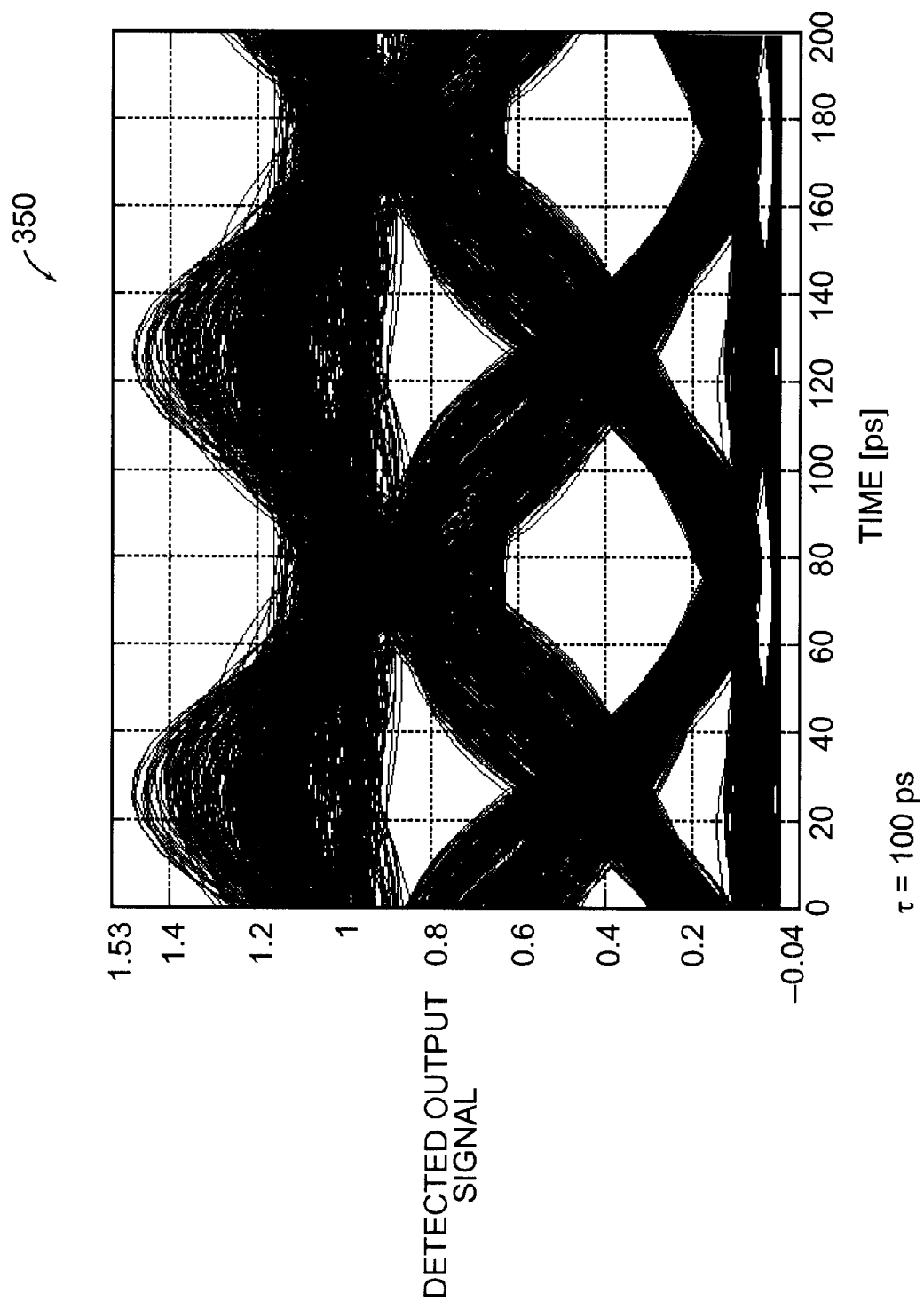
FIG. 4A illustrates a simulated 10 Gb/s optical eye diagram for a received signal transmitted over 150 km of optical fiber with dispersion of 16 ps/(km·nm) by the transmitter of FIG. 1 with the delay element generating a delay equal to a full bit period (100 ps delay).

FIG. 4A illustrates a simulated 10 Gb/s optical eye diagram 350 for a received signal transmitted over 150 km of optical fiber with dispersion of 16 ps/(km·mn) by the transmitter 100 of FIG. 1 with the delay element 110 generating a delay that is equal to a full bit period (100 ps delay). The dispersion tolerance of the transmitter 100 represents an improvement over conventional prior art transmitters. However, the opening in the eye diagram 350 is relatively narrow indicating a significant dispersion penalty. The poor tolerance to dispersion is manifested as intersymbol interference and is not due to the accumulation of optical noise produced by components, such as fiber amplifiers, since such effects were not included in the simulation. The dispersion tolerance of the transmitter 100 of FIG. 1 can be improved by reducing the delay generated by the delay element 110 to less than a full bit period.

Figure 4B:
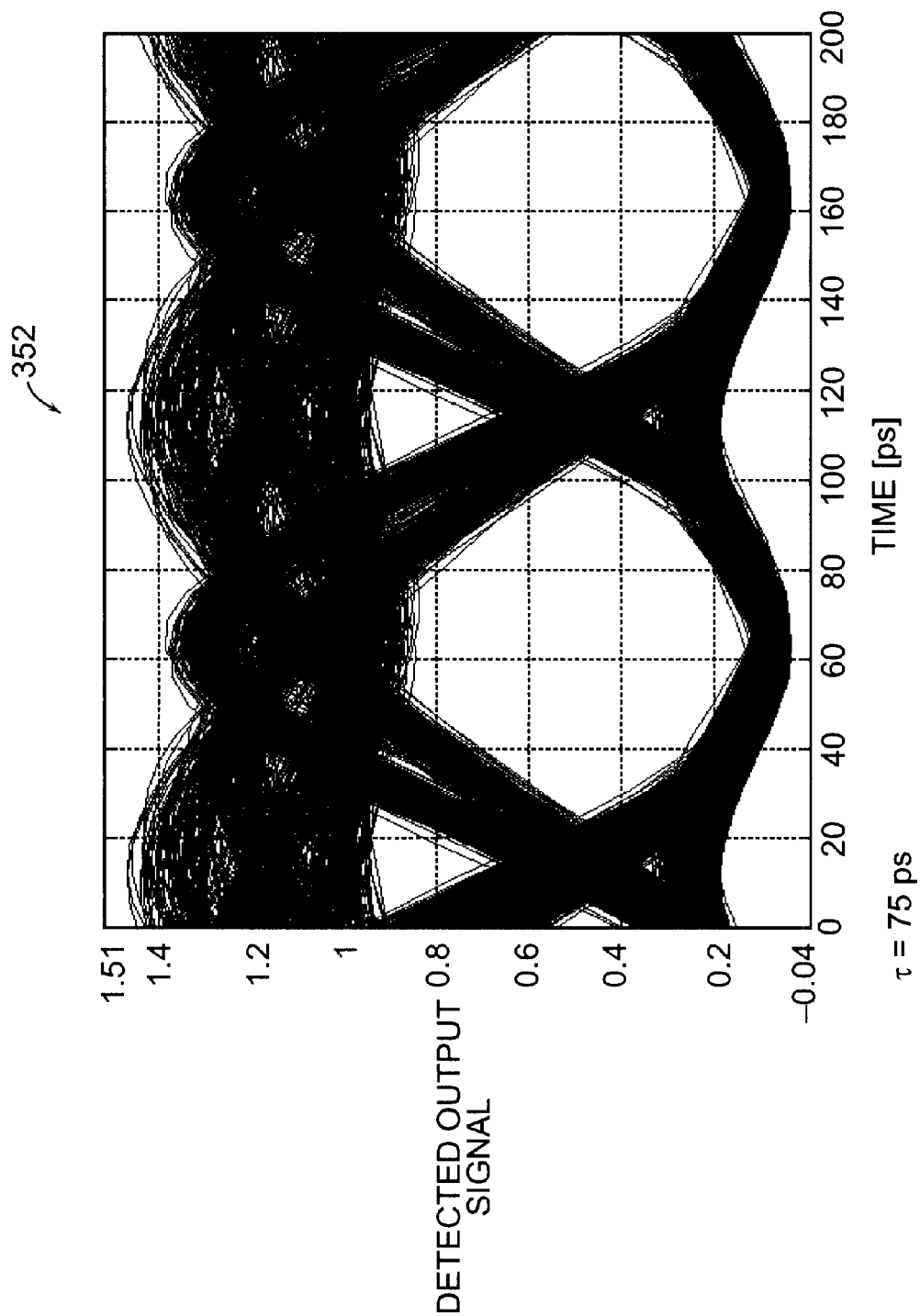
FIG. 4B illustrates a simulated 10 Gb/s optical eye diagram for a received signal transmitted over 150 km of optical fiber with dispersion of 16 ps/(km·nm) by the dispersion tolerant transmitter of FIG. 1 with the delay element generating a delay equal to 0.75T (75 ps delay).

FIG. 4B illustrates a simulated 10 Gb/s optical eye diagram 352 for a received signal transmitted over 150 km of optical fiber with dispersion of 16 ps/(km·nm) by the dispersion tolerant transmitter of FIG. 1 with the delay element 110 generating a delay that is equal to 0.75T(75 ps delay). The dispersion tolerant transmitter 100 using a delay of less than one bit period produces a significantly larger eye opening in the eye diagram 352 as compared with the transmitter 100 using the full bit period delay. The larger eye opening shown in FIG. 4B as compared with the relatively narrow eye opening shown in FIG. 4A indicates an improved tolerance to dispersion, which results in a lower bit error rate at the receiver.

Thus, the four-level signal generated by the dispersion tolerant transmitter 100 provides a larger eye opening after propagation as compared with three level signals that are generated by prior art transmitters using duobinary coding. Therefore, the dispersion tolerant transmitter 100 has a greater tolerance to the effects of fiber dispersion and non-linear effects as compared with both conventional NRZ fiber-optic transmitters and prior art duobinary transmitters.

As previously discussed, the improved tolerance to dispersion is due, at least in part, to the fact that the optical amplitude oscillates about zero because the delay generated by the delay element 110 (FIG. 1) is less than one full bit period. The oscillations tend to decay to zero as the signal propagates down the fiber, thereby preserving the amplitude of the ones without degrading the zero level. The oscillations have peaks that occur at the boundaries of the bits, so the oscillations do not degrade the extinction ratio. These oscillations are not present in prior art duobinary signals where the delay is a full bit period.

The optimum delay generated by the delay element 110 (FIG. 1) that results in the highest dispersion tolerance depends upon the signal bandwidth. Generally, as the delay is reduced or the signal bandwidth is increased, the peak amplitude of the oscillations is increased. For example, the optimum delay generated by the delay element 110 is 0.75T when the signal bandwidths are limited to seventy-five percent (75%) of the bit rate. This yields intermediate levels of the 4-level signal with amplitudes that are approximately fifty percent (50%) of the corresponding peak amplitudes of the 4-level signal.

Figure 5:
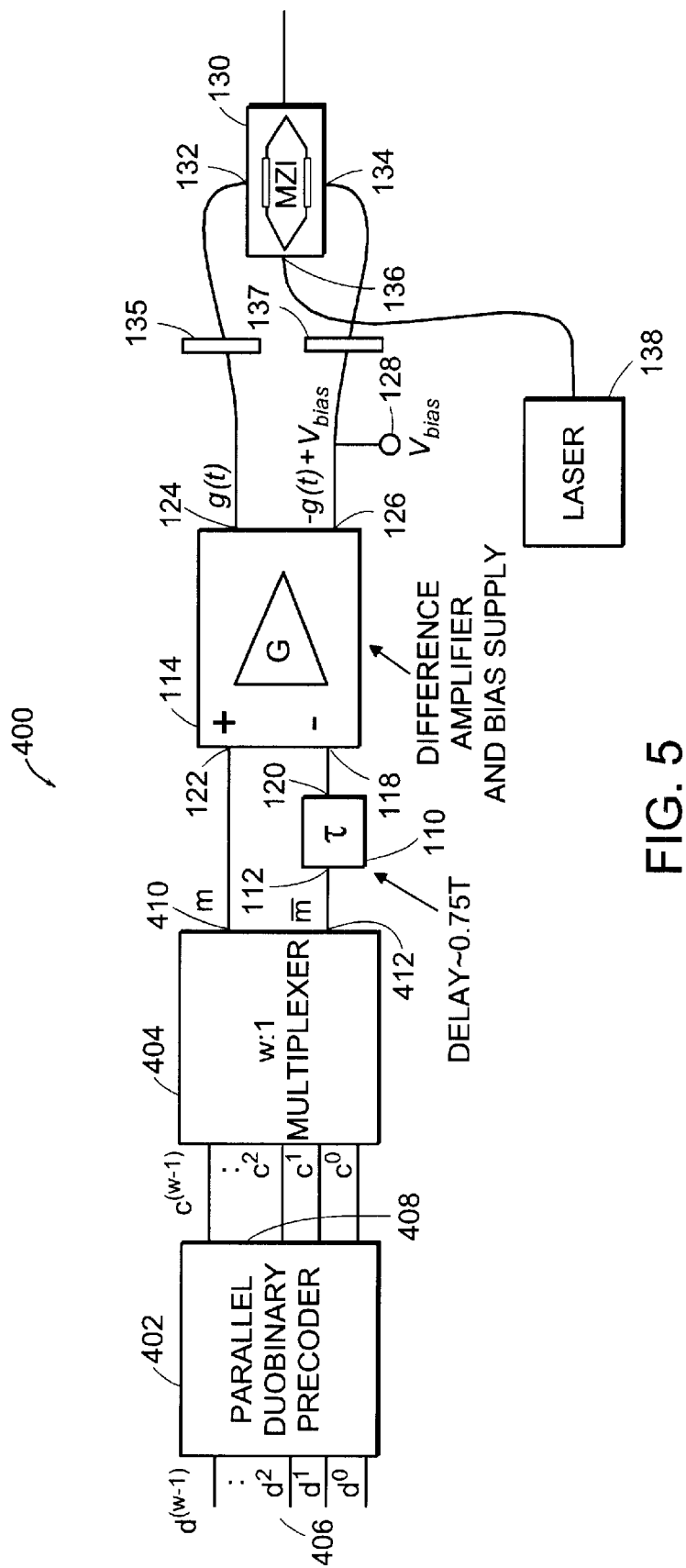
FIG. 5 illustrates one embodiment of a dispersion tolerant transmitter according to the present invention that includes a parallel data input.

FIG. 5 illustrates one embodiment of a dispersion tolerant transmitter 400 according to the present invention that includes a parallel data input 406. The parallel input dispersion tolerant transmitter 400 is similar to the serial input dispersion tolerant transmitter 100 that was described in connection with FIG. 1.

However, the transmitter 400 includes a parallel duobinary precoder 402 and a time division multiplexer 404. The parallel duobinary precoder 404 includes a parallel input data bus 406 having a width that is equal to w and having data inputs $d^0$ through $d^{(w-1)}$. The rate of parallel coding is equal to 1/w multiplied by the bit rate of the equivalent serial data stream.

The parallel duobinary precoder 402 codes data on the data bus 406 in parallel. The rate of parallel coding is a lower rate compared with the rate of serial coding performed by the serial precoder 102 (FIG. 1) that was described in connection with the serial input dispersion tolerant transmitter 100 of FIG. 1. The parallel duobinary precoder 402 can be relatively inexpensive because it can be implemented with a field programmable gate array or an application specific integrated circuit (ASIC). Using programmable gate arrays or ASICs can significantly reduce the cost of the parallel input transmitter 400.

The parallel duobinary precoder 402 produces a w wide output 408 that can be represented by:

$$c_n^j = c_n^{j-1} \oplus \overline{d}_n^j \quad j \ni [1, w) \qquad (4)$$
$$c_n^0 = c_{n-1}^{w-1} \oplus \overline{d}_n^0$$

where n is the sample number of the lower speed parallel data stream and w is the number of input channels.

The w wide output 408 of the parallel duobinary precoder is coupled to the time division multiplexer 404. The time division multiplexer 404 generates a binary precoded bit sequence m and a complementary binary precoded bit sequence $\overline{m}$ in serial data streams at an output 410 and a complementary output 412, respectively, where $$m_i = c_{int(i/w)}^{imodw} \quad (5)$$

and int(i/w) is the integer part of the quotient i/w at a bit rate that is w-times faster than the bit rate of the data signals applied to data inputs $d^0$ through $d^{(w-1)}$ of the parallel duobinary precoder 402. Time varying electrical signals m(t) and $\overline{m}$ (t) correspond to the binary precoded bit sequence m and the complementary binary precoded data signal $\overline{m}$, respectively, as described in connection with the transmitter 100 of FIG. 1.

The parallel input transmitter 400 includes a delay element 110 having an input 112 that is coupled to the complementary output 412 of the time division multiplexer 404. In addition, the parallel input transmitter 400 includes a differential amplifier 114 that has a first input 118 that is coupled to an output 120 of the delay element 110 and a second input 122 that is coupled to the output 410 of the time division multiplexer 404.

In another embodiment (not shown), the delay element 110 is coupled between the output 410 of the time division multiplexer 404 and the second input 122 of the differential amplifier 114. In this embodiment, the complementary output 412 of the time division multiplexer 404 is directly coupled to the first input 118 of the differential amplifier 114.

In yet another embodiment (not shown), the delay element 110 is coupled between the output 412 of the time division multiplexer 404 and the first input 118 of the differential amplifier 114. A second delay element (not shown) is coupled between the output 410 of the time division multiplexer 404 and the second input 122 of the differential amplifier 114.

The differential amplifier 114 converts the binary precoded data signal and the complementary binary precoded data signal to a difference signal g(t) and to a complementary difference signal -g(t) at a differential output 124 and a complementary differential output 126, respectively. The difference signal g(t) and the complementary difference signal -g(t) are four-level data signals.

In one embodiment, a bias network, such as a bias tee 128, adds a bias voltage to one of the difference signal g(t) and the complementary difference signal -g(t). In the embodiment shown, the bias tee 128 adds a bias voltage to the complementary difference signal -g(t) to generate a complementary difference signal with a DC offset voltage -g(t)+ $V_{bias}$.

In addition, the parallel input transmitter 400 includes an optical data modulator 130. In the embodiment shown, the optical data modulator 130 is a differential input Mach Zehnder interferometric (MZI) data modulator having a first 132 and a second data input 134 that are coupled to the differential output 124 and a complementary differential output 126, respectively, of the differential amplifier 114.

The optical data modulator 130 also includes an optical input 136 that receives an optical signal from an optical source, such as a laser 138. The data modulator 130 modulates an amplitude of a continuous wave optical signal in response to the four-level data signal and the complementary four-level data signal and generates a modulated optical output signal.

The signals transmitted by the parallel input transmitter 400 can be recovered by a receiver (not shown) that uses binary intensity direct detection, as described in connection with the transmitter 100 of FIG. 1. A (1:w) time division demultiplexer (not shown) demultiplexes the detected signals to recover the input data signal d.

Figure 6:
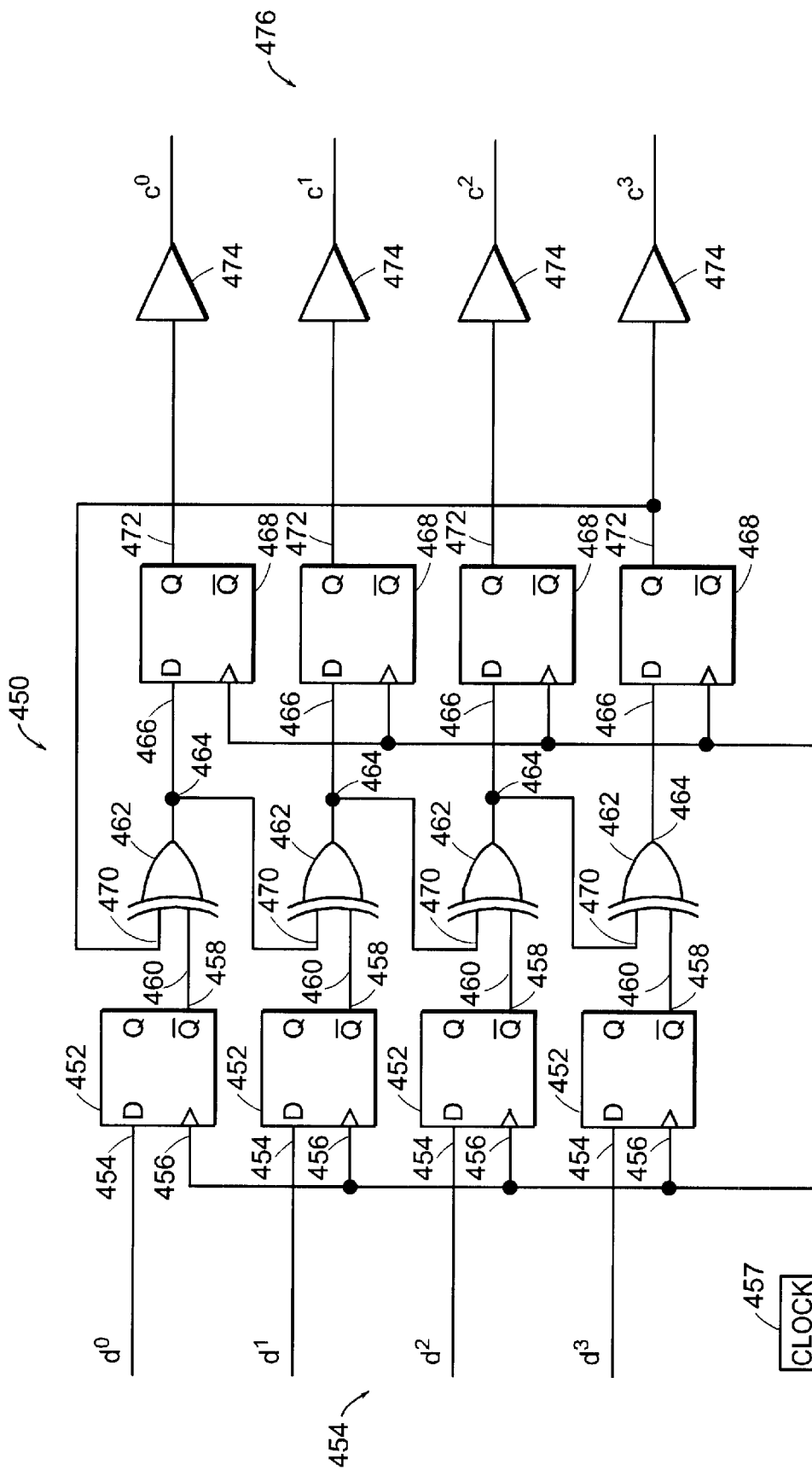
FIG. 6 illustrates a functional block diagram of one embodiment of a four-bit-wide (w=4) parallel duobinary precoder circuit that can be used with the parallel input dispersion tolerant transmitter of FIG. 5.

FIG. 6 illustrates a functional block diagram of one embodiment of a four-bit-wide (w=4) parallel duobinary precoder circuit 450 that can be used with the parallel input transmitter 400 of FIG. 5. The parallel duobinary precoder circuit 450 includes four D-type flip-flops 452. Each of the flip-flops 452 receives one of the four input data signals $d^0$ through $d^3$ at a data input 454. Each of the flip-flops 452 has a clock input 456 that is connected to a common clock 457.

The complementary output 458 of each of the flip flops 452 is connected to one input 460 of an exclusive OR gate 462. The outputs 464 of each of the exclusive OR gates 462 are connected to data inputs 466 of four D-type flip-flops 468. The other input 470 of each of the exclusive OR gates 462 is connected to either an output 464 of one of the exclusive OR gates 462 or an output 472 of one of the four D-type flip-flops 468.

The output 472 of each of the four D-type flip-flops 468 can be coupled to a buffer 474. The four-bit-wide (w=4) parallel duobinary precoder circuit 450 has a four-bit-wide parallel duobinary data output 476 for outputting the output data signals $c^0$ through $C^3$. Numerous other types of parallel duobinary precoder circuits can be used with the parallel input transmitter 400 of FIG. 5.

Figure 7A:
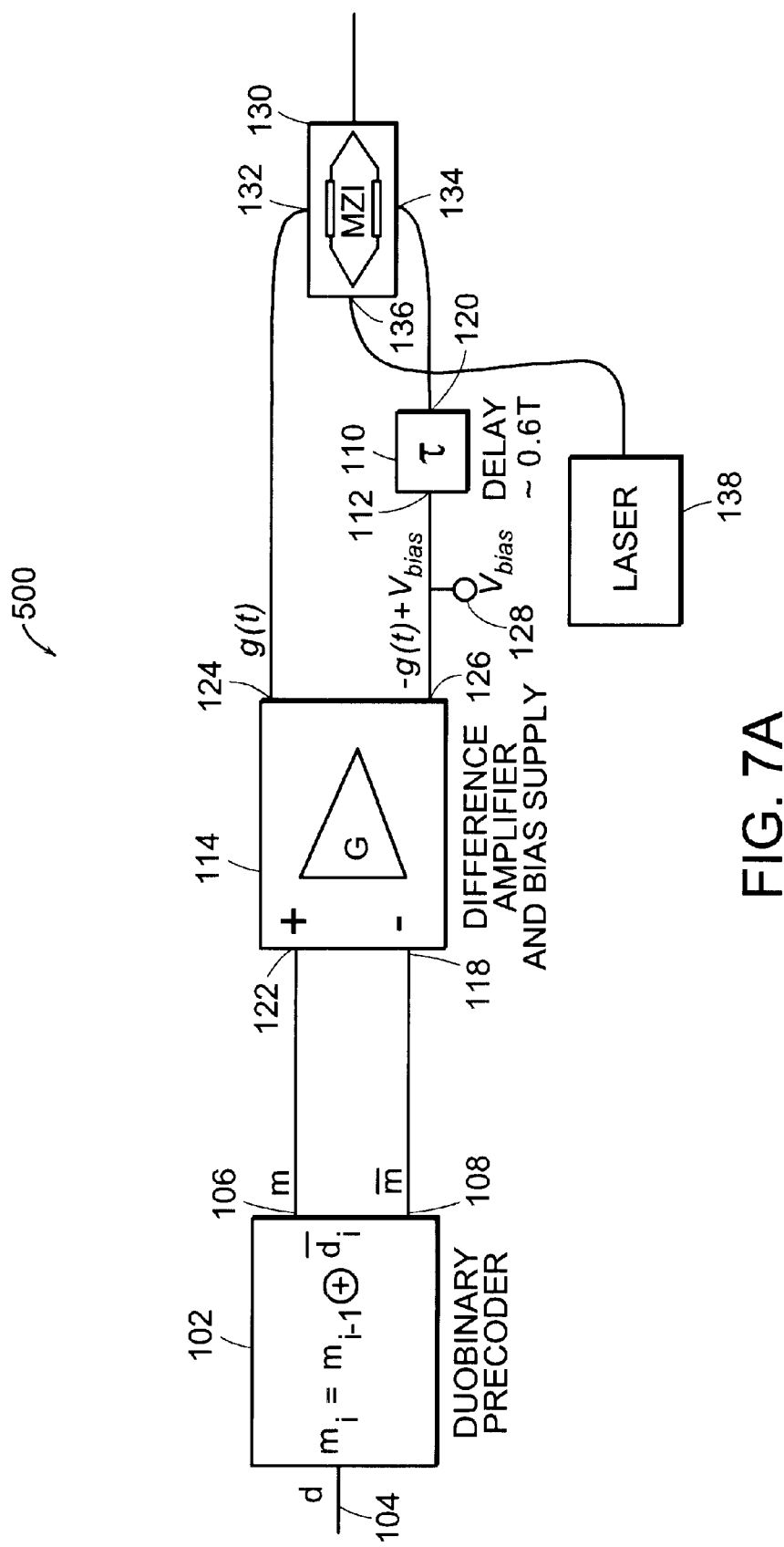
FIG. 7A illustrates another embodiment of a dispersion tolerant transmitter according to the present invention that includes a serial data input.

FIG. 7A illustrates another embodiment of a dispersion tolerant transmitter 500 according to the present invention that includes a serial data input. The transmitter 500 of FIG. 7A is similar to the transmitter 100 of FIG. 1. However, in this embodiment, there is no net delay between the inputs to the differential amplifier.

The transmitter 500 includes a serial duobinary precoder 102 as described in connection with FIG. 1. The duobinary precoder 102 has a serial data input 104 that receives an input data signal. The duobinary precoder 102 also has an output 106 and a complementary output 108 that generates a binary precoded data signal and a complementary binary precoded data signal, respectively.

The output 106 of the duobinary precoder 102 is connected to the second input 122 of the differential amplifier 114. The complementary output 108 of the duobinary precoder 102 is connected to the first input 118 of the differential amplifier 114. In other embodiments, a single input amplifier (not shown) is connected to one of the output 106 and the complementary output 108 of the duobinary precoder 102. In another embodiment described herein with reference to FIG. 7B, the differential amplifier 114 is not used and the duobinary precoder 102 generates signals having output voltages that are sufficient to directly drive a modulator.

The differential amplifier 114 converts the binary precoded data signal and the complementary binary precoded data signal to a difference signal g(t) and to a complementary difference signal -g(t) at a differential output 124 and a complementary differential output 126, respectively.

In one embodiment, a bias network, such as a bias tee 128, adds a bias voltage to one of the difference signal g(t) and the complementary difference signal -g(t). In the embodiment shown, the bias tee 128 adds a bias voltage to the complementary difference signal -g(t) to generate a complementary difference signal with a DC offset voltage -g(t)+ $V_{bias}$. In another embodiment, the differential amplifier 114 includes a bias voltage source that adds a bias voltage to one of the difference signal g(t) and the complementary difference signal -g(t).

The transmitter 500 includes a delay element 110 having an input 112 that is coupled to the complementary differential output 126 of the differential amplifier 114. In another embodiment, the delay element 110 is coupled to the differential output 124 of the differential amplifier 114. In yet another embodiment, a second delay element (not shown) is coupled to the differential output 124 of the differential amplifier 114.

The delay element 110 delays the complementary difference signal with the DC offset voltage $-g(t)+V_{bias}$ relative to the difference signal g(t) by a time τ to generate a delayed complementary difference signal with DC offset voltage $-g(t-\tau)+V_{bias}$. In one embodiment, τ is a time corresponding to less than one bit period of the binary precoded data signal. In one embodiment, τ is a time in the range of 0.4T to 0.8T. The optimum delay of the delay element 110 that generates the greatest tolerance to dispersion is a function of the bandwidth of the signals g(t) and −g(t). For example, when these signals have a bandwidth of seventy-five percent (75%) of the bit rate, the optimum delay is 0.6T.

In addition, the transmitter 500 includes an optical data modulator 130. In the embodiment shown, the optical data modulator 130 is a differential input MZI data modulator. A first data input 132 of the differential input data modulator 130 is coupled to the differential output 124 of the differential amplifier 114. A second input 134 of the differential input data modulator 130 is coupled to an output 120 of the delay element 110. In the embodiment where the delay element 110 is coupled to the output 124 of the differential amplifier 114, the first data input 132 of the differential input data modulator 130 is coupled to the output 120 of the delay element 110 and the second input 134 of the differential input data modulator 130 is coupled to the complementary differential output 126 of the differential amplifier 114.

In one embodiment, the delay element 110 is integrated into a cable (not shown) that couples the complementary output 126 of the differential amplifier 114 to the second input 134 of the differential input data modulator 130. In another embodiment, the delay element 110 comprises the cable itself and the delay is generated by propagating the complementary binary precoded data signal through the cable. In this embodiment, the length of the cable is selected to correspond to the delay.

The differential input data modulator 130 also includes an optical input 136 that receives an optical signal from an optical source, such as a laser 138. The data modulator 130 modulates a continuous wave optical signal in response to the difference signal g(t) and the delayed complementary difference signal with DC offset voltage $-g(t-\tau)+V_{bias}$. In one embodiment, the $V_{bias}$ voltage $V_{bias}$ is adjusted so that when $g(t)+g(t-\tau)-V_{bias}$ is equal to the average of the maximum value of $g(t)+g(t-\tau)-V_{bias}$ and the minimum value of $g(t)+g(t-\tau)-V_{bias}$ the optical output power from the differential input data modulator 130 is at a minimum power level.

Figure 7B:
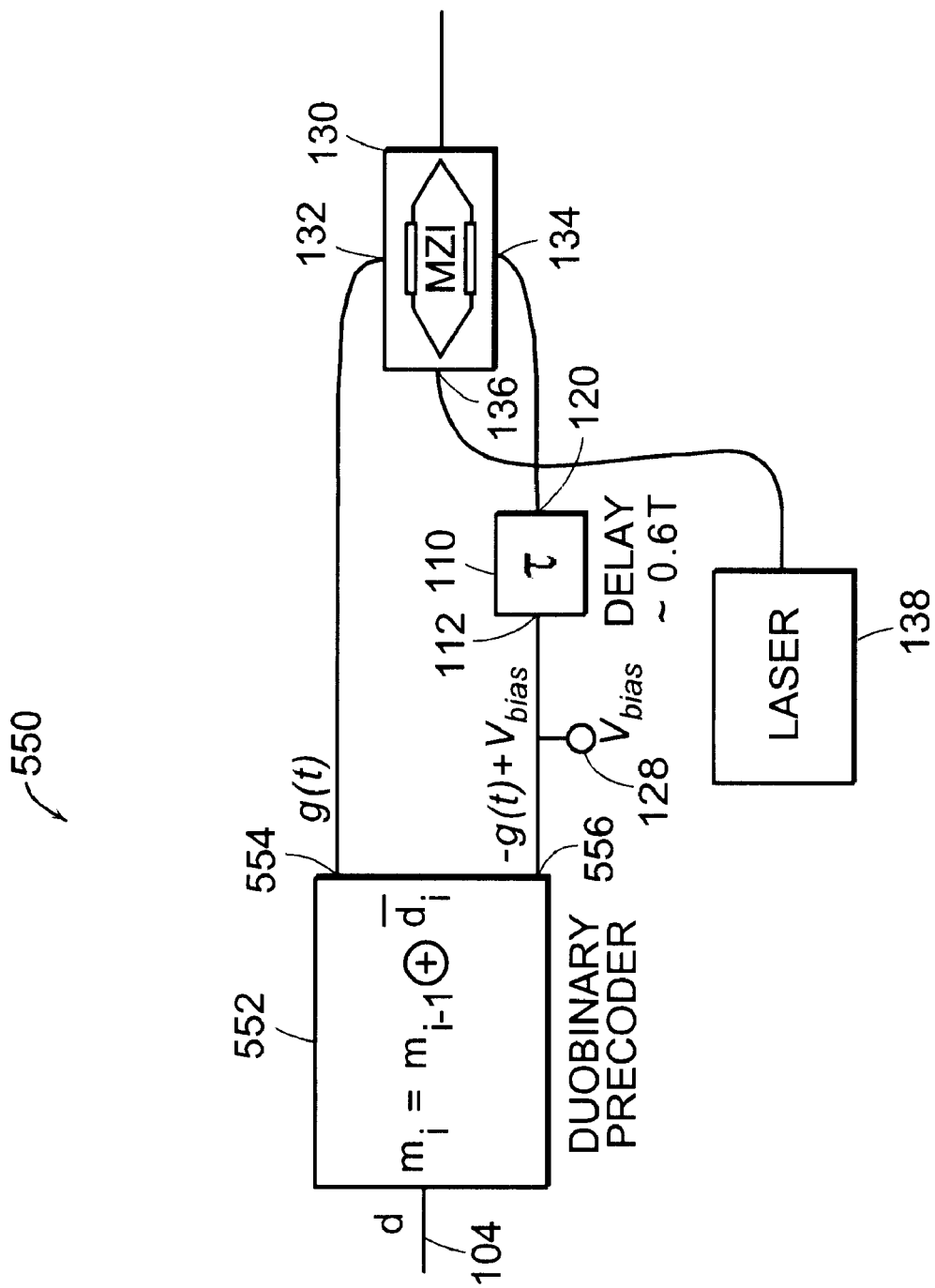
FIG. 7B illustrates another embodiment of a dispersion tolerant transmitter according to the present invention that includes a serial data input.

FIG. 7B illustrates another embodiment of a dispersion tolerant transmitter 550 according to the present invention that includes a serial data input. The transmitter 550 of FIG. 7B is similar to the transmitter 500 of FIG. 7A. However, in this embodiment, the transmitter 550 does not include a differential amplifier 114. The serial duobinary precoder 552 generates a signal that directly drives an optical data modulator without using external amplification.

The serial duobinary precoder 552 has a serial data input 104 that receives an input data signal. The duobinary precoder 552 also has an output 554 and a complementary output 556 that generates a difference signal g(t) and a complementary difference signal −g(t), respectively. In one embodiment, the serial duobinary precoder 552 includes an internal amplifier (not shown) that amplifies the difference signal g(t) and the complementary difference signal −g(t) to a sufficient level to directly drive an optical modulator.

In one embodiment, a bias network, such as a bias tee 128, adds a bias voltage to one of the difference signal g(t) and the complementary difference signal −g(t). In the embodiment shown, the bias tee 128 adds a bias voltage to the complementary difference signal −g(t) to generate a complementary difference signal with a DC offset voltage $-g(t)+V_{bias}$.

The transmitter 550 includes a delay element 110 having an input 112 that is coupled to the complementary output 556 of the duobinary precoder 552. The delay element 110 delays the complementary difference signal with the DC offset voltage $-g(t)+V_{bias}$ relative to the difference signal g(t) by a time τ to generate a delayed complementary difference signal with DC offset voltage $-g(t-\tau)+V_{bias}$. In one embodiment, τ is a time corresponding to less than one bit period of the binary precoded data signal.

In addition, the transmitter 550 includes a differential input MZI data modulator 130. A first data input 132 of the differential input data modulator 130 is coupled to the output 554 of the duobinary precoder 552. A second input 134 of the differential input data modulator 130 is coupled to an output 120 of the delay element 110.

The differential input data modulator 130 also includes an optical input 136 that receives an optical signal from an optical source, such as a laser 138. The data modulator 130 modulates a continuous wave optical signal in response to the difference signal g(t) and the delayed complementary difference signal with DC offset voltage $-g(t-\tau)+V_{bias}$. In one embodiment, the bias voltage $V_{bias}$ is adjusted so that when $g(t)+g(t-\tau)-V_{bias}$ is equal to the average of the maximum value of $g(t)+g(t-\tau)-V_{bias}$ and the minimum value of $g(t)+g(t-\tau)-V_{bias}$, the optical output power from the differential input data modulator 130 is at a minimum power level.

Figure 8:
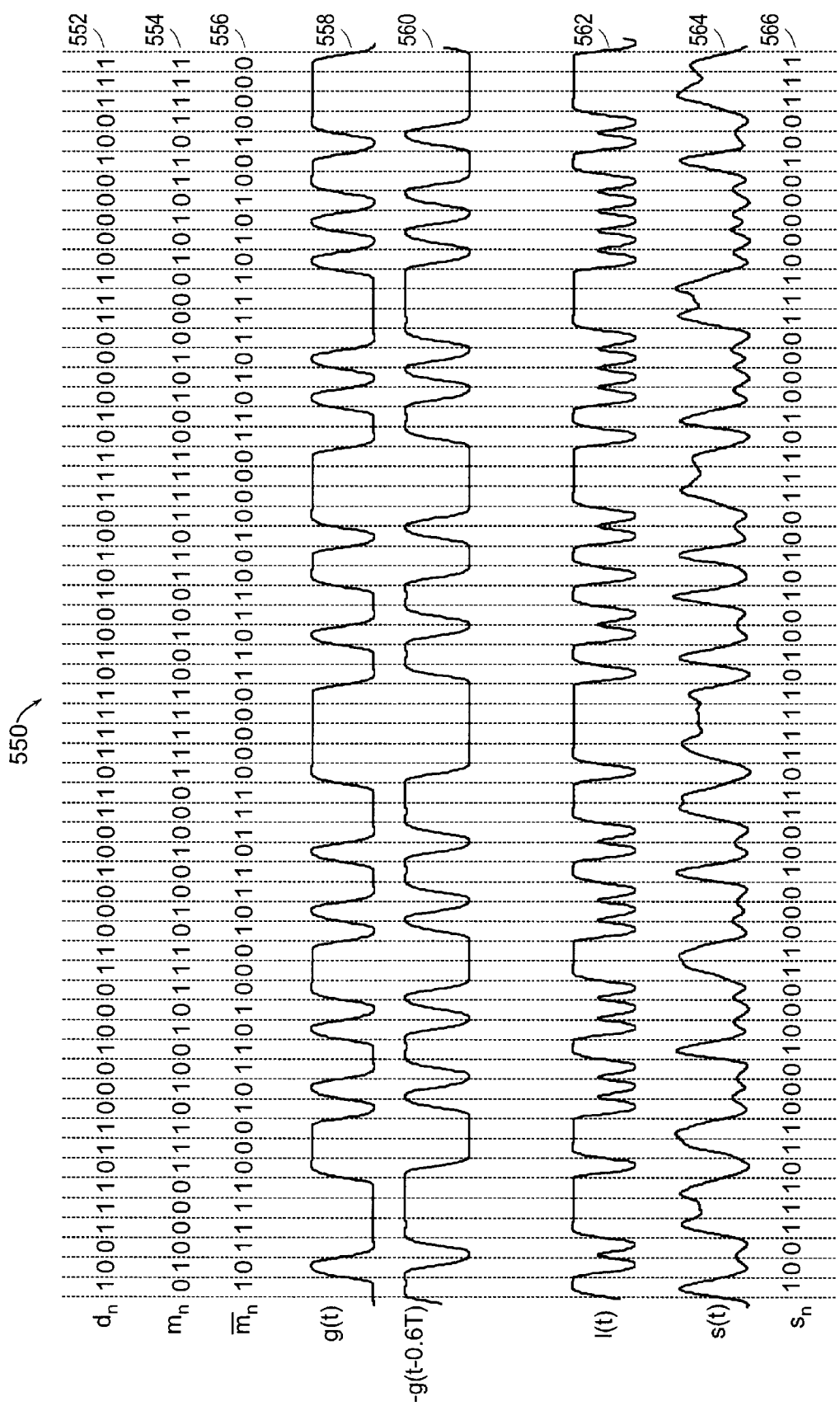
FIG. 8 illustrates representative bit sequences and signals showing operation of the dispersion tolerant transmitter of FIG. 7A.

FIG. 8 illustrates representative bit sequences and signals 550 showing operation of the dispersion tolerant transmitter 500 of FIG. 7A. The bit sequences and signals 550 are represented for a delay element 110 that has a delay of 0.6T, which corresponds to the optimum time delay for a bandwidth of approximately seventy-five percent (75%) of the bit rate. The representative bit sequences and signals 550 showing operation of the dispersion tolerant transmitter 500 of FIG. 7A are similar to the representative bit sequences and signals 300 of FIG. 3 showing operation of the dispersion tolerant transmitter 100 of FIG. 1 with the exception that in the bit sequences and signals 550, g(t) and −g(t−τ) are binary signals instead of four-level signals.

A representative binary data bit graph 552 shows a representative stream of binary data bits $d_n$ at a bit rate equal to 1/T, where T is the bit period. A binary precoded data graph 554 illustrates a binary precoded bit sequence m that corresponds to the binary bit sequence d in the binary data bit graph 552 after being processed by the duobinary precoder 102 (FIG. 7A). A complementary binary precoded data graph 556 illustrates the complementary binary precoded bit sequence $\overline{m}$ that corresponds to the binary data bits $d_n$ in the binary data bit graph 552 after being processed by the duobinary precoder 102 (FIG. 7A).

A difference signal graph 558 illustrates the difference signal g(t) generated by the differential amplifier 114 (FIG. 7A) at the differential output 124. A delayed complementary difference signal graph 560 illustrates the delayed complementary difference signal −g(t−τ) generated by the differential amplifier 114 and the delay element 110 for a delay of 0.6T.

An optical intensity graph 562 illustrates the optical power I(t) of the optical signal that is modulated in response to the difference signal g(t) and the delayed complementary difference signal $-g(t-\tau)$. The optical power waveform I(t) is a three level signal with the smaller peaks centered on the bit boundaries that is very similar to the optical power waveform I(t) that is generated by transmitter 100, which is illustrated in the optical intensity graph 318 of FIG. 3.

In addition, the representative bit sequences and signals shown in FIG. 8 includes a received signal graph 564 that illustrates a received signal s(t) that represents the simulated electrical output of a noiseless detector following propagation through 150 km of optical fiber with a dispersion coefficient of 16 ps/(km·nm). The received signal s(t) of FIG. 8 also represents a significant improvement in dispersion tolerance compared with signals that are coded with duobinary signaling obtained using prior art methods having a delay of T. A received bit sequence graph 566 shows the received bit sequence corresponding to the received signal s(t).

Figure 9A:
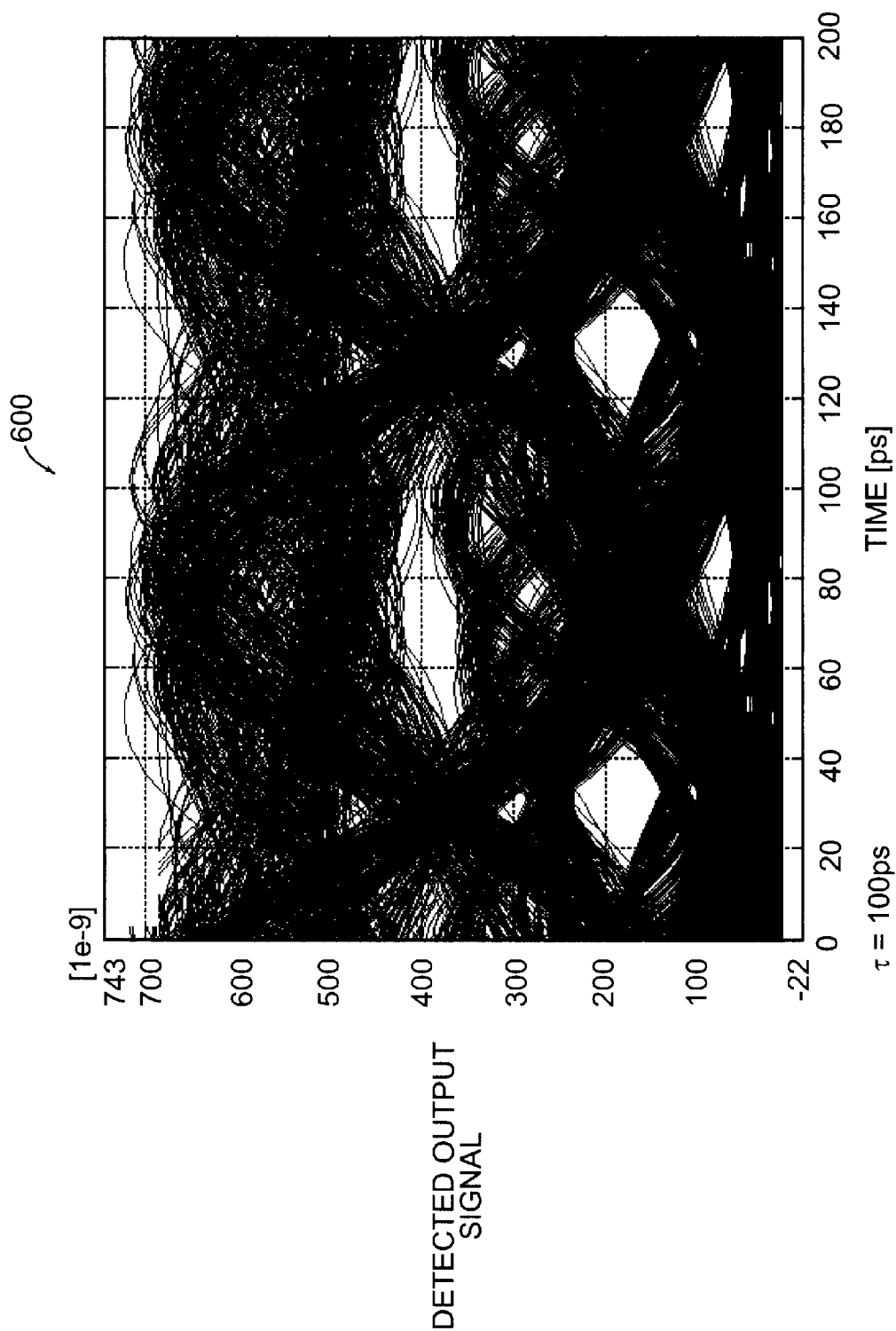
FIG. 9A illustrates a simulated 10 Gb/s optical eye diagram for a received signal transmitted over 150 km of optical fiber with dispersion of 16 ps/(km·nm) by the transmitter of FIG. 8 with the delay element generating a delay equal to a full bit period (100 ps delay).

FIG. 9A illustrates a simulated 10 Gb/s optical eye diagram 600 for a received signal transmitted over 150 km of optical fiber with dispersion of 16 ps/(km·nm) by the transmitter 500 of FIG. 7A with the delay element 110 generating a delay that is equal to a full bit period (100 ps delay). The dispersion tolerance of the transmitter 500 represents an improvement over prior art conventional NRZ transmitters. However, the eye diagram 600 is closed indicating poor tolerance to dispersion that results from propagating an optical signal through 150 kms of optical fiber having dispersion of 16 ps/(km·nm). The poor tolerance to dispersion is manifested as intersymbol interference and is not due to the accumulation of optical noise produced by components, such as fiber amplifiers since such effects were not included in the simulation. The dispersion tolerance of the transmitter 500 of FIG. 7A can be improved by reducing the delay generated by the delay element 110 to less than a full bit period. This produces the peaks with maxima located at the bit boundaries in the optical power waveform 562 shown in FIG. 8. These peaks have the beneficial effect of preserving the neighboring ones in the sequence by virtue of the destructive interference that occurs as the ones broaden under the influence of fiber dispersion.

FIG. 9B illustrates a simulated 10 Gb/s optical eye diagram 602 for a received signal transmitted over 150 km of optical fiber with dispersion of 16 ps/(km·nm) by the transmitter 500 of FIG. 7A with the delay element 110 generating a delay that is equal to 0.6T(60 ps). The dispersion tolerant transmitter 500 using a delay less than one bit period produces a significantly larger eye opening in the eye diagram 602 as compared with the transmitter 500 of FIG. 7A using the full bit period delay. The larger eye opening indicates an improved tolerance to dispersion, which results in a lower bit error rate at the receiver.

The dispersion tolerance of the transmitter 100 of FIG. 1 is greater than the dispersion tolerance of the transmitter 500 of FIG. 7A. The dispersion tolerance of the transmitter 500 of FIG. 7A is lower because the modulator 130 is not driven with signals that are of equal magnitude and opposite sign. This results in some frequency chirp in the optical signal that has a deleterious effect on propagation.

Figure 10:
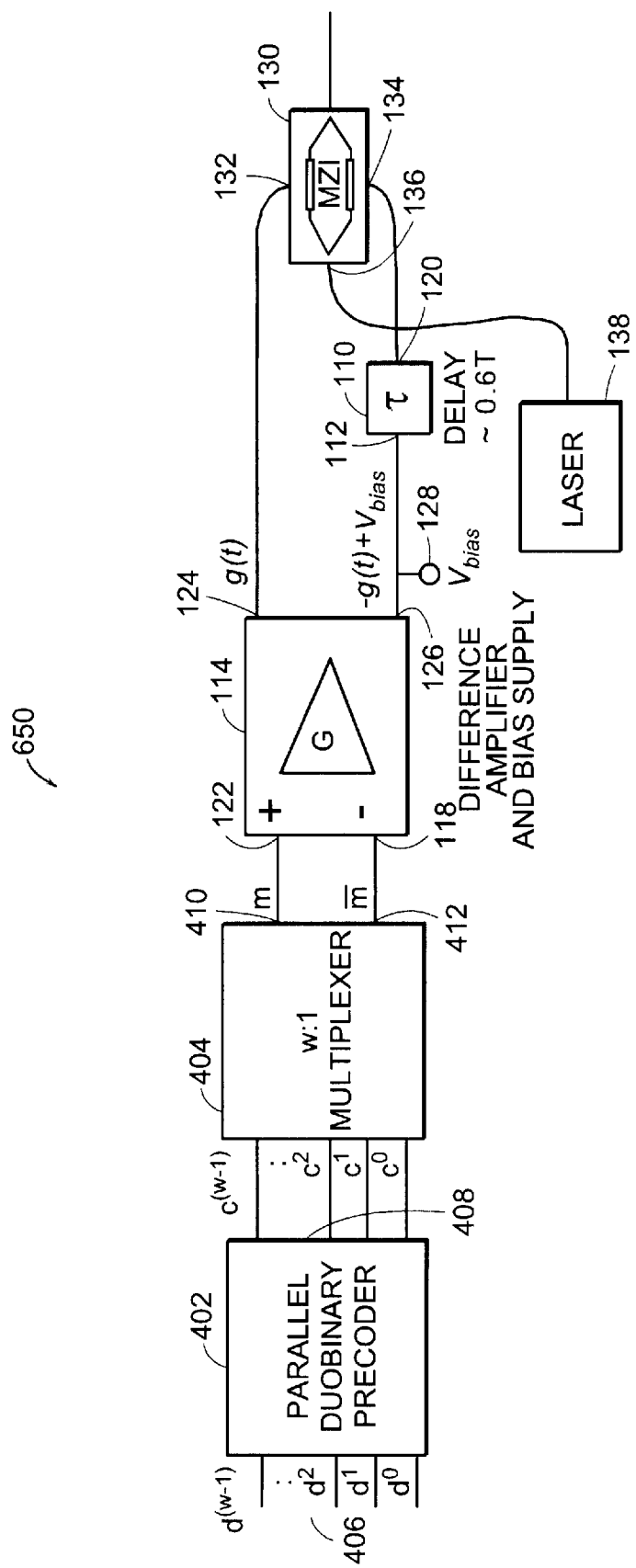
FIG. 10 illustrates another embodiment of a dispersion tolerant transmitter according to the present invention that includes a parallel data input.

FIG. 10 illustrates another embodiment of a dispersion tolerant transmitter 650 according to the present invention that includes a parallel data input. The parallel input dispersion tolerant transmitter 650 is similar to the serial input dispersion tolerant transmitter 500 that was described in connection with FIG. 7A.

However, the transmitter 650 includes a parallel duobinary precoder 402 and a time division multiplexer 404 as described herein in connection with FIG. 5. The parallel duobinary precoder 402 includes a parallel input data bus 406 having a width that is equal to w and having data inputs $d^0$ through $d^{(w-1)}$. The parallel duobinary precoder 402 codes data on the data bus 406 in parallel. The rate of parallel coding is equal to 1/w multiplied by the bit rate of the equivalent serial data stream.

The w wide output 408 of the parallel duobinary precoder is coupled to the time division multiplexer 404. The time division multiplexer 404 generates a binary precoded bit sequence $\overline{m}$ and a complementary binary precoded bit sequence $\overline{m}$ in serial data streams at an output 410 and a complementary output 412, respectively at a bit rate that is w-times faster than the bit rate of the data signals applied to data inputs $d^0$ through $d^{(w-1)}$ of the parallel duobinary precoder 402.

The output 410 and the complementary output 412 of the time division multiplexer 404 are connected to a differential amplifier 114. In another embodiment, a single input amplifier (not shown) is connected to one of the output 410 and the complementary output 412 of the time division multiplexer 404. In yet another embodiment, the differential amplifier 114 is not used and the time division multiplexer 404 generates signals having output voltages that are sufficient to directly drive a modulator.

The differential amplifier 114 converts the binary precoded data signal and the complementary binary precoded data signal to a difference signal g(t) and to a complementary difference signal $-g(t)$ at a differential output 124 and a complementary differential output 126, respectively. The difference signal g(t) and the complementary difference signal $-g(t)$ are bandwidth limited two-level data signals.

In one embodiment, a bias network, such as a bias tee 128, adds a bias voltage to one of the difference signal g(t) and the complementary difference signal $-g(t)$. In the embodiment shown, the bias tee 128 adds a bias voltage to the complementary difference signal $-g(t)$ to generate a complementary difference signal with a DC offset voltage $-g(t)+V_{bias}$. In another embodiment, the differential amplifier 114 includes a bias voltage source that adds a bias voltage to one of the difference signal g(t) and the complementary difference signal $-g(t)$.

The transmitter 650 includes a delay element 110 having an input 112 that is coupled to the complementary differential output 126 of the differential amplifier 114. In another embodiment, the delay element 110 is coupled to the differential output 124 of the differential amplifier 114. In yet another embodiment, a second delay element (not shown) is coupled to the differential output 124 of the differential amplifier 114.

The delay element 110 delays the complementary difference signal with the DC offset voltage $-g(t)+V_{bias}$ relative to the difference signal g(t) by a time $\tau$ to generate a delayed complementary difference signal with DC offset voltage $-g(t-\tau)+V_{bias}$. In one embodiment, $\tau$ is a time corresponding to less than one bit period of the binary precoded data signal. In one embodiment, $\tau$ is a time in the range of 0.4T to 0.8T. As described in connection with FIG. 5, the optimum delay of the delay element 110 that generates the greatest tolerance to dispersion is a function of the bandwidth of the signals g(t) and $-g(t)$. For example, when these signals have a bandwidth of seventy-five percent (75%) of the bit rate, the optimum delay is 0.6T In addition, the transmitter 650 includes an optical data modulator 130. In the embodiment shown, the optical data modulator 130 is a differential input MZI data modulator. A first data input 132 of the differential input data modulator 130 is coupled to the differential output 124 of the differential amplifier 114. A second input 134 of the differential input data modulator 130 is coupled to an output 120 of the delay element 110.

In another embodiment the delay element 110 is coupled to the output 124 of the differential amplifier 114. In this embodiment, the first data input 132 of the differential input data modulator 130 is coupled to the output 120 of the delay element 110 and the second input 134 of the differential input data modulator 130 is coupled to the complementary differential output 126 of the differential amplifier 114.

The differential input data modulator 130 also includes an optical input 136 that receives an optical signal from an optical source, such as a laser 138. The data modulator 130 modulates an amplitude of a continuous wave optical signal in response to the difference signal g(t) and the delayed complementary difference signal with DC offset voltage $-g(t-\tau)+V_{bias}$. In one embodiment, the bias voltage $V_{bias}$ is adjusted so that when $g(t)+g(t-\tau)-V_{bias}$ is equal to the average of the maximum value of $g(t)+g(t-\tau)-V_{bias}$ and the minimum value of $g(t)+g(t-\tau)-V_{bias}$, the optical output power from the differential input data modulator 130 is at a minimum power level.

Equivalents

While the invention has been particularly shown and described with reference to specific preferred embodiments, it should be understood by those skilled in the art that various changes in form and detail may be made therein without departing from the spirit and scope of the invention as defined herein.

What is claimed is:

1. An optical data transmitter comprising:
   a) a precoder that converts an input data signal to a binary precoded data signal and to a complementary binary precoded data signal at an output and a complementary output, respectively;
   b) a delay element coupled to one of the output and the complementary output of the precoder, the delay element delaying one of the complementary binary precoded data signal and the binary precoded data signal relative to the other at an output of the delay element, by a time corresponding to less than one bit period of the binary precoded data signal;
   c) a differential amplifier having a first input that is coupled to the output of the delay element and a second input that is coupled to one of the output and the complementary output of the precoder, the differential amplifier converting the binary precoded data signal and the complementary binary precoded data signal to a four-level data signal and to a complementary four-level data signal at a differential output and a complementary differential output, respectively; and
   d) an optical data modulator having a data input that is coupled to one of the differential output and the complementary differential output of the differential amplifier, the optical data modulator modulating an amplitude of the optical signal applied to an optical input of the optical data modulator in response to at least one of the four-level data signal and the complementary four-level data signal, respectively, to generate a modulated optical output signal.

2. The optical data transmitter of claim 1 wherein the optical data modulator comprises a single input zero-chirp Mach-Zehnder modulator.

3. The optical data transmitter of claim 1 wherein the optical data modulator includes a second data input that is coupled to the other one of the differential output and the complementary differential output, the optical data modulator modulating an amplitude of the optical input signal in response to the four-level data signal and the complementary four-level data signal to generate the modulated optical output signal.

4. The optical data transmitter of claim 3 wherein the optical data modulator comprises a differential input Mach-Zehnder modulator.

5. The optical data transmitter of claim 3 wherein the modulator comprises a predetermined operating point that is chosen so an intensity of the modulated optical output signal is minimized when the amplitude of the four-level data signal is substantially equal to an average of the four levels comprising the four level data signal, and the amplitude of the complementary four-level data signal is substantially equal to an average of the four levels comprising the complementary four-level data signal.

6. The optical data transmitter of claim 3 further comprising at least one of a first and a second filter, the first filter having an input that is coupled to the differential output and an output that is coupled to the first data input of the modulator, the second filter having an input that is coupled to the complementary differential output of the differential amplifier and an output that is coupled to the second data input of the optical data modulator, the first and the second filter reducing the bandwidth of the four-level data signal and the complementary four level data signal, respectively.

7. The optical data transmitter of claim 6 wherein at least one of the first filter and the second filter provides an adjustable cut-off frequency.

8. The optical data transmitter of claim 1 wherein the delay element delays one of the complementary binary precoded data signal and the binary precoded data signal relative to the other by a time corresponding to between 0.4 and 0.9 of the bit period of the binary precoded data signal.

9. The optical data transmitter of claim 1 wherein the four-level data signal comprises a minimum amplitude, a first intermediate amplitude, a second intermediate amplitude, and a maximum amplitude, an average of the minimum amplitude and the maximum amplitude being substantially equal to an average of the first intermediate amplitude and the second intermediate amplitude.

10. The optical data transmitter of claim 1 wherein the modulator comprises a predetermined operating point that is chosen so an intensity of the output optical signal is minimized when the amplitude of the four-level data signal is substantially equal to an average of the four levels of the four-level data signal.

11. The optical data transmitter of claim 1 further comprising a bias voltage source that adjusts an average amplitude of at least one of the four-level data signal and the complementary four-level data signal to change an operating point of the optical data modulator.

12. The optical data transmitter of claim 1 wherein the precoder comprises a serial precoder.

13. The optical data transmitter of claim 1 wherein the precoder comprises:
   a) a parallel precoder having n sets of parallel data inputs that receive n sets of parallel data, the parallel precoder generating n sets of parallel precoded data at n sets of parallel outputs from the n sets of parallel data; and
   b) a multiplexer having n sets of parallel data inputs that are coupled to the n sets of parallel outputs of the parallel precoder, respectively, the multiplexer generating the binary precoded data signal and the complementary binary precoded data signal at the output and the complementary output, respectively.

14. The optical data transmitter of claim 1 further comprising a filter having an input that is coupled to one of the differential output and the complementary differential output of the differential amplifier and having an output that is coupled to the data input of the optical data modulator, the filter reducing the bandwidth of at least one of the four-level data signal and complementary four-level data signal.

15. The optical data transmitter of claim 14 wherein the filter provides an adjustable cut-off frequency.

16. The optical data transmitter of claim 1 wherein the delay element comprises a variable delay element.

17. The optical data transmitter of claim 1 wherein the delay element is selected to increase dispersion tolerance of a communication system that includes the optical data transmitter.

18. A method for coding an optical data signal, the method comprising:
   a) converting an input data signal to a binary precoded data signal and to a complementary binary precoded data signal;
   b) generating a delayed data signal by delaying one of the complementary binary precoded data signal and the binary precoded data signal relative to the other by less than one bit period of the binary precoded data signal;
   c) converting the delayed data signal and the other of the complementary binary precoded data signal and the binary precoded data signal to a four-level data signal and to a complementary four-level data signal; and
   d) modulating an optical signal with at least one of the four level data signal and the complementary four-level data signal, thereby generating a modulated optical output signal with four amplitude levels.

19. The method of claim 18 wherein an amplitude of the modulated optical output signal is substantially zero when the at least one of the four-level data signal and the complementary four-level data signal is substantially equal to an average of amplitudes of the four levels comprising the at least one of the four-level data signal and the complementary four-level data signal.

20. The method of claim 18 wherein the converting the input data signal to a binary precoded data signal and to a complementary binary precoded data signal comprises:
   a) converting n sets of parallel data signals to n sets of parallel precoded data signals; and
   b) multiplexing the n sets of parallel precoded data signals to generate the binary precoded data signal and the complementary binary precoded data signal.

21. The method of claim 18 wherein the generating the delayed data signal comprises delaying one of the complementary binary precoded data signal and the binary precoded data signal relative to the other by a time corresponding to between 0.4 and 0.9 of the bit period of the binary precoded data signal.

22. The method of claim 18 wherein the generating the delayed data signal comprises delaying by a time that increases dispersion tolerance of a communication system using the method for coding an optical data signal.

23. The method of claim 18 wherein the four-level data signal comprises a minimum amplitude, a first intermediate amplitude, a second intermediate amplitude, and a maximum amplitude, an average of the minimum amplitude and the maximum amplitude being substantially equal to an average of the first intermediate amplitude and the second intermediate amplitude.

24. The method of claim 23 further comprising adjusting at least one of the first intermediate and the second intermediate amplitude relative to the minimum amplitude and to the maximum amplitude to increase dispersion tolerance of a communication system using the method for coding an optical data signal.

25. The method of claim 24 wherein the adjusting at least one of the first intermediate amplitude and the second intermediate amplitude relative to the minimum amplitude and to the maximum amplitude comprises filtering at least one of the four-level data signal and the complementary four-level data signal.

26. The method of claim 24 wherein the adjusting at least one of the first intermediate amplitude and the second intermediate amplitude relative to the minimum amplitude and to the maximum amplitude comprises delaying one of the complementary binary precoded data signal and the binary precoded data signal relative to the other by less than one bit period of the binary precoded data signal.

27. An optical data transmitter comprising:
   a) means for converting an input data signal to a binary precoded data signal and to a complementary binary precoded data signal;
   b) means for generating a delayed data signal by delaying one of the complementary binary precoded data signal and the binary precoded data signal relative to the other by less than one bit period of the binary precoded data signal;
   c) means for converting the delayed data signal and the other of the complementary binary precoded data signal and the binary precoded data signal to a four-level data signal and to a complementary four-level data signal; and
   d) means for modulating an optical signal with at least one of the four level data signal and the complementary four-level data signal, thereby generating a modulated optical output signal with four amplitude levels.

28. The optical data transmitter of claim 27 wherein the means for converting the input data signal to the binary precoded data signal and to the complementary binary precoded data signal comprises:
   a) means for converting n sets of parallel data signals to n sets of parallel precoded data signals; and
   b) means for multiplexing the n sets of parallel precoded data signals to generate the binary precoded data signal and the complementary binary precoded data signal.

29. The optical data transmitter of claim 27 wherein the means for generating the delayed data signal comprises delaying one of the complementary binary precoded data signal and the binary precoded data signal relative to the other by a time corresponding to between 0.4 and 0.9 of the bit period of the binary precoded data signal.

30. The optical data transmitter of claim 27 wherein the means for generating the delayed data signal comprises delaying by a time that increases dispersion tolerance of a communication system using the optical data transmitter.

31. The optical data transmitter of claim 27 wherein the four-level data signal comprises a minimum amplitude, a first intermediate amplitude, a second intermediate amplitude, and a maximum amplitude, an average of the minimum amplitude and the maximum amplitude being substantially equal to an average of the first intermediate amplitude and the second intermediate amplitude.

32. The optical data transmitter of claim 27 further comprising means for adjusting at least one of the first intermediate amplitude and the second intermediate amplitude relative to the minimum amplitude and to the maximum amplitude to increase dispersion tolerance of a communication system using the optical data transmitter.

33. The optical data transmitter of claim 32 wherein the means for adjusting at least one of the first intermediate amplitude and the second intermediate amplitude relative to the minimum amplitude and to the maximum amplitude comprises filtering at least one of the four-level data signal and the complementary four-level data signal.

34. The optical data transmitter of claim 32 wherein the means for adjusting at least one of the first intermediate amplitude and the second intermediate amplitude relative to the minimum amplitude and to the maximum amplitude comprises delaying one of the complementary binary precoded data signal and the binary precoded data signal relative to the other by less than one bit period of the binary precoded data signal.

* * * * *

UNITED STATES PATENT AND TRADEMARK OFFICE
CERTIFICATE OF CORRECTION

PATENT NO.     : 6,623,188 B1  
DATED          : September 23, 2003  
INVENTOR(S)    : Dimmick et al.

It is certified that error appears in the above-identified patent and that said Letters Patent is hereby corrected as shown below:

<u>Title page,</u>  
Item [75], Inventors, should read as follows: replace "Nalm" with -- Naim --  
Item [73], Assignee, should read as follows: replace "Optiuh" with -- Optium --

Signed and Sealed this

Thirteenth Day of January, 2004

JON W. DUDAS  
*Acting Director of the United States Patent and Trademark Office*